United States Patent
Endo et al.

(10) Patent No.: US 8,931,514 B2
(45) Date of Patent: Jan. 13, 2015

(54) LIQUID FLOW RATE CONTROL VALVE

(75) Inventors: Tsuneo Endo, Wako (JP); Seiichiro Ishikawa, Wako (JP); Hidemi Arai, Wako (JP); Yuki Shibahata, Wako (JP); Mitsuo Kadota, Wako (JP); Hiroshi Hanabusa, Wako (JP); Daiki Sato, Wako (JP); Kensaku Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 13/497,094

(22) PCT Filed: Sep. 30, 2010

(86) PCT No.: PCT/JP2010/067122
§ 371 (c)(1),
(2), (4) Date: Jun. 5, 2012

(87) PCT Pub. No.: WO2011/040550
PCT Pub. Date: Apr. 7, 2011

(65) Prior Publication Data
US 2012/0234417 A1    Sep. 20, 2012

(30) Foreign Application Priority Data

Oct. 1, 2009   (JP) ................................. 2009-229630

(51) Int. Cl.
*F16K 3/26*     (2006.01)
*F16K 3/34*     (2006.01)
(Continued)

(52) U.S. Cl.
CPC ... *F16K 3/34* (2013.01); *B60K 6/12* (2013.01); *B60K 6/40* (2013.01); *F02N 7/08* (2013.01);
(Continued)

(58) Field of Classification Search
CPC ........... F16K 11/20; F16K 3/34; F16K 11/24; F16K 11/12; F15B 13/0406
USPC .................... 137/614, 625.31, 625.3, 614.16, 137/625.15, 625.32; 91/375 R
See application file for complete search history.

(56) References Cited

U.S. PATENT DOCUMENTS 2,349,641 A * 5/1944 Tucker et al. .................. 418/43
2,395,979 A   3/1946 Tucker et al.
(Continued)

FOREIGN PATENT DOCUMENTS

DE   196 13 845 A1   10/1996
DE   101 10 764 A1   9/2002
(Continued)

OTHER PUBLICATIONS

US Office Action issued in co-pending application U.S. Appl. No. 13/498,399 dated Dec. 13, 2013.
(Continued)

*Primary Examiner* — John Rivell
*Assistant Examiner* — David Colon Morales
(74) *Attorney, Agent, or Firm* — Carrier Blackman & Associates, P.C.; William D. Blackman; Joseph P. Carrier

(57) ABSTRACT

A liquid flow rate control valve is provided in which since a total area of overlapping sections of a communication hole group (38c, 38d) of a distributor (38) and an outlet opening (37a, 37b) of a sleeve (37) changes when the distributor (38) is rotated by a first electric motor (46), if a rotor (42) is rotated by means of a second electric motor (47), an input port (31e) communicates with an output port (31f) through an inlet opening (42c, 42d) of the rotor (42), the communication hole group (38c, 38d) of the distributor (38), and the outlet opening (37a, 37b) of the sleeve (37) when the inlet opening (42c, 42d) of the rotor (42) passes through the overlapping sections, thereby making it possible to carry out PWM control of a flow rate of liquid. Since a thrust load in an axis (L) direction does not act on the distributor (38) and the rotor (42), supporting the distributor (38) and the rotor (42) becomes easy, thereby enabling the cost and weight to be cut.

15 Claims, 28 Drawing Sheets

(51) Int. Cl.
*B60K 6/12* (2006.01)
*B60K 6/40* (2007.10)
*F02N 7/08* (2006.01)
*F15B 13/04* (2006.01)
*F15B 13/044* (2006.01)

(52) U.S. Cl.
CPC ............ *F16K 3/262* (2013.01); *F15B 13/0406* (2013.01); *F15B 13/0444* (2013.01); *Y02T 10/6208* (2013.01); *Y02T 10/6282* (2013.01)
USPC .................. 137/625.3; 137/625.32; 91/375 R

(56) References Cited

U.S. PATENT DOCUMENTS

| | | | |
|---|---|---|---|
| 3,018,622 A | | 1/1962 | Werts |
| 3,069,025 A | * | 12/1962 | Winkler et al. ............... 414/737 |
| 3,185,439 A | | 5/1965 | Inaba et al. |
| 3,213,881 A | | 10/1965 | Findlay et al. |
| 4,037,620 A | | 7/1977 | Johnson |
| 4,109,683 A | * | 8/1978 | Strache ...................... 137/625.3 |
| 4,697,929 A | | 10/1987 | Muller |
| 4,700,747 A | * | 10/1987 | Wartelle ................... 137/625.23 |
| 4,779,512 A | | 10/1988 | Leonard |
| 4,793,133 A | | 12/1988 | White et al. |
| 4,800,924 A | | 1/1989 | Johnson |
| 4,964,612 A | | 10/1990 | Maggioni et al. |
| 4,977,816 A | | 12/1990 | Kuttruf |
| 5,242,150 A | | 9/1993 | Shiffler et al. |
| 5,467,800 A | | 11/1995 | Sallas |
| 5,522,416 A | * | 6/1996 | Farrell et al. .................... 137/38 |
| 5,950,664 A | * | 9/1999 | Battaglia ....................... 137/375 |
| 5,954,093 A | | 9/1999 | Leonard |
| 5,971,604 A | * | 10/1999 | Linga et al. .................... 366/340 |
| 6,594,992 B1 | * | 7/2003 | Naito et al. ....................... 60/430 |
| 6,769,451 B2 | | 8/2004 | Hjelsand |
| 6,826,988 B2 | | 12/2004 | Gass et al. |
| 7,322,375 B2 | * | 1/2008 | Goldfarb et al. ......... 137/625.32 |
| 2002/0079003 A1 | * | 6/2002 | Scampini ................. 137/625.32 |
| 2008/0104955 A1 | | 5/2008 | Khalil |

FOREIGN PATENT DOCUMENTS

| | | | | |
|---|---|---|---|---|
| GB | 2104249 A | * | 3/1983 | ............ F15B 13/044 |
| JP | S58-75023 U | | 5/1983 | |
| JP | S63-501635 A | | 6/1988 | |
| JP | H04-238739 A | | 8/1992 | |
| JP | H06-29963 U | | 4/1994 | |
| JP | H08-104147 A | | 4/1996 | |
| JP | 2000-272890 A | | 10/2000 | |
| JP | 2001-027340 A1 | | 1/2001 | |
| JP | 2002-347671 A | | 12/2002 | |
| JP | 2006-037820 A | | 2/2006 | |
| JP | 2006-249990 A | | 9/2006 | |
| JP | 2007-224737 A | | 9/2007 | |
| JP | 2008-121697 A | | 5/2008 | |
| JP | 2008-247320 A | | 10/2008 | |
| JP | 2009-068553 A | | 4/2009 | |
| JP | 2009-126398 | | 6/2009 | |
| JP | 2009-255611 A | | 11/2009 | |
| WO | 03/016761 A1 | | 2/2003 | |

OTHER PUBLICATIONS

A Japanese Official Communication (Decision of Granting a Patent) issued in the corresponding JP Patent Application 2010-221177 (domestic priority claimed from withdrawn JP 2009-229630).

\* cited by examiner angle of 180°, having phases displaced from each other by 180°, and being spaced so as not to overlap one another in the axis direction, a width in the axis direction of the second communication hole group positioned in a middle being twice a width in the axis direction of the first and third communication hole groups positioned on opposite sides thereof, and the rotor comprises two sets of first to third inlet openings having the same phase at positions with a phase difference of 180°, the first to third inlet openings being capable of communicating with the first to third communication hole groups respectively.

Moreover, according to a seventh aspect of the present invention, in addition to any one of the first to sixth aspects, when the overlapping sections of the outlet opening of the sleeve and the communication hole group of the distributor are a minimum, an area of opening of the communication hole group of the distributor communicating with the inlet opening of the rotor decreases.

Further, according to an eighth aspect of the present invention, in addition to any one of the first to sixth aspects, when the overlapping sections of the outlet opening of the sleeve and the communication hole group of the distributor are a minimum, a hole diameter of the communication hole group of the distributor communicating with the inlet opening of the rotor decreases.

First to third outlet openings 37a, 37b, and 37c of an embodiment correspond to the outlet opening of the present invention, first to third communication hole groups 38c, 38d, and 38g of the embodiment correspond to the communication hole group of the present invention, first to third first inlet openings 42c, 42d, and 42g of the embodiment correspond to the inlet opening of the present invention, a first electric motor 46 of the embodiment corresponds to the first drive source of the present invention, and a second electric motor 47 of the embodiment corresponds to the second drive source of the present invention.

EFFECTS OF THE INVENTION

In accordance with the first aspect of the present invention, since the total area of overlapping sections of the communication hole group of the distributor and the outlet opening of the sleeve changes when the distributor is rotated by the first drive source, if the rotor is rotated by means of the second drive source the input port communicates with the output port through the inlet opening of the rotor, the communication hole group of the distributor, and the outlet opening of the sleeve when the inlet opening of the rotor passes through the overlapping sections and the communication of the input port with the output port is cut off when the inlet opening of the rotor is not passing through the overlapping sections, thereby making it possible to carry out PWM control of the flow rate of liquid. In this process, the duty ratio can be freely controlled by adjusting the rotational position of the distributor, and the duty frequency can be freely controlled by adjusting the rotational speed of the rotor. Furthermore, with regard to the communication hole group of the distributor, since communication of each communication hole is cut off, it is possible to prevent liquid from short circuiting in the circumferential direction in a section where the communication hole group does not overlap the outlet opening of the sleeve. Moreover, since a thrust load in the axial direction does not act on the distributor and the rotor, supporting the distributor and the rotor becomes easy, thereby enabling the cost and weight to be cut.

Furthermore, in accordance with the second aspect of the present invention, since the sleeve includes the first and second outlet openings having a central angle of 180°, having phases displaced from each other by 180°, and being spaced so as not to overlap one another in the axial direction, the distributor includes the first and second communication hole groups having a central angle of 180°, having phases displaced from each other by 180°, and being spaced so as not to overlap one another in the axial direction, and the rotor includes two sets of first and second inlet openings having the same phase at positions with a phase difference of 180°, not only is it possible to adjust the duty ratio to any value from 0% to 100%, but it is also possible to output a duty waveform at two cycles per rotation of the rotor, thereby giving a high duty frequency while keeping the rotational speed of the second drive source low. Furthermore, it is possible to avoid overlapping of the first and second outlet openings in the axial direction to thus prevent the sleeve from being divided into two members, and it is possible to avoid overlapping of the first and second communication hole groups in the axial direction to thus prevent the rigidity of the distributor from being degraded.

Moreover, in accordance with the third aspect of the present invention, since the sleeve includes the first to third outlet openings having a central angle of 120°, having phases displaced from each other by 120°, and being spaced so as not to overlap one another in the axial direction, the distributor includes the first to third communication hole groups having a central angle of 120°, having phases displaced from each other by 120°, and being spaced so as not to overlap one another in the axial direction, and the rotor includes three sets of first to third inlet openings having the same phase at positions with a phase difference of 120°, not only is it possible to adjust the duty ratio to any value from 0% to 100%, but it is also possible to output a duty waveform at three cycles per rotation of the rotor, thereby giving a high duty frequency while keeping the rotational speed of the second drive source low. Furthermore, it is possible to avoid overlapping of the first to third outlet openings in the axial direction to thus prevent the sleeve from being divided into three members, and it is possible to avoid overlapping of the first to third communication hole groups in the axial direction to thus prevent the rigidity of the distributor from being degraded.

Furthermore, in accordance with the fourth aspect of the present invention, since the communication hole group of the distributor is arranged so that when liquid passes through the communication hole group of the distributor the load imposed on the distributor by the liquid pressure does not generate a moment that makes the axis of the distributor tilt, it is possible to prevent the distributor from tilting relative to the sleeve and the rotor to thus generate galling, thereby enabling the driving forces of the first drive source and the second drive source to be reduced.

Moreover, in accordance with the fifth aspect of the present invention, since the sleeve includes the first and second outlet openings having a central angle of 90°, having phases displaced from each other by 180°, and being disposed at positions so as to overlap one another in the axial direction, the distributor includes, at a phase difference of 90°, the two first inlet openings having phases displaced from each other by 180° and the two second inlet openings having phases displaced from each other by 180°, and the first and second inlet openings can communicate with the first and second communication hole groups, not only is it possible to adjust the duty ratio to any value from 0% to 100%, but it is also possible to output a duty waveform at two cycles per rotation of the rotor, thereby giving a high duty frequency while keeping the rotational speed of the second drive source low. Furthermore, it is possible to avoid overlapping of the first and second outlet openings in the circumferential direction to thus prevent the sleeve from being divided into two members, it is possible to avoid overlapping of the first and second communication hole groups in the circumferential direction to thus prevent the rigidity of the distributor from being degraded and, moreover, it is possible to shorten the dimension in the axial direction of the sleeve, the distributor, and the rotor. Even if liquid pressure acts on the first and second communication hole groups of the distributor, it is possible to prevent the liquid pressure from generating a moment that makes the axis of the distributor tilt, thus avoiding the occurrence of galling and thereby enabling the driving forces of the first and second drive sources to be reduced.

Furthermore, in accordance with the sixth aspect of the present invention, since the sleeve includes the first and third outlet openings and the second outlet opening having a central angle of 180°, having phases displaced from each other by 180°, and being spaced so as not to overlap one another in the axial direction, the width in the axial direction of the second outlet opening positioned in the middle is twice the width in the axial direction of the first and third outlet openings positioned on opposite sides thereof, the distributor includes the first and third communication hole groups and the second communication hole group having a central angle of 180°, having phases displaced from each other by 180°, and being spaced so as not to overlap one another in the axial direction, the width in the axial direction of the second communication hole group positioned in the middle is twice the width in the axial direction of the first and third communication hole groups positioned on opposite sides thereof, the rotor includes two sets of first to third inlet openings having the same phase and positions with a phase difference of 180°, and the first to third inlet openings can communicate with the first to third communication hole groups respectively, not only is it possible to adjust the duty ratio to any value from 0% to 100%, but it is also possible to output a duty waveform at two cycles per rotation of the rotor, thereby giving a high duty frequency while keeping the rotational speed of the second drive source low. Furthermore, it is possible to avoid overlapping of the first to third outlet openings in the axial direction to thus prevent the sleeve from being divided into three members, and it is possible to avoid overlapping of the first to third communication hole groups in the axial direction to thus prevent the rigidity of the distributor from being degraded. Even if liquid pressure acts on the first to third communication hole groups of the distributor, it is possible to prevent the liquid pressure from generating a moment that makes the axis of the distributor tilt, thus avoiding the occurrence of galling and thereby enabling the driving forces of the first and second drive sources to be reduced.

Moreover, in accordance with the seventh aspect of the present invention, since the area of opening of the communication hole group of the distributor communicating with the inlet opening of the rotor decreases when the overlapping sections of the outlet opening of the sleeve and the communication hole group of the distributor are a minimum, it is possible to stabilize the output characteristics of the liquid pressure at a low duty ratio.

Furthermore, in accordance with the eighth aspect of the present invention, since the hole diameter of the communication hole group of the distributor communicating with the inlet opening of the rotor decreases when the overlapping sections of the outlet opening of the sleeve and the communication hole group of the distributor are a minimum, it is possible to stabilize the output characteristics of the liquid pressure at a low duty ratio.

In the above-mentioned aspects, the above-mentioned operational effects can be exhibited in the same manner even if liquid flows from the output port to the input port via the outlet opening, the communication hole group, and the inlet opening.

EXPLANATION OF REFERENCE NUMERALS AND SYMBOLS

Figure 1:
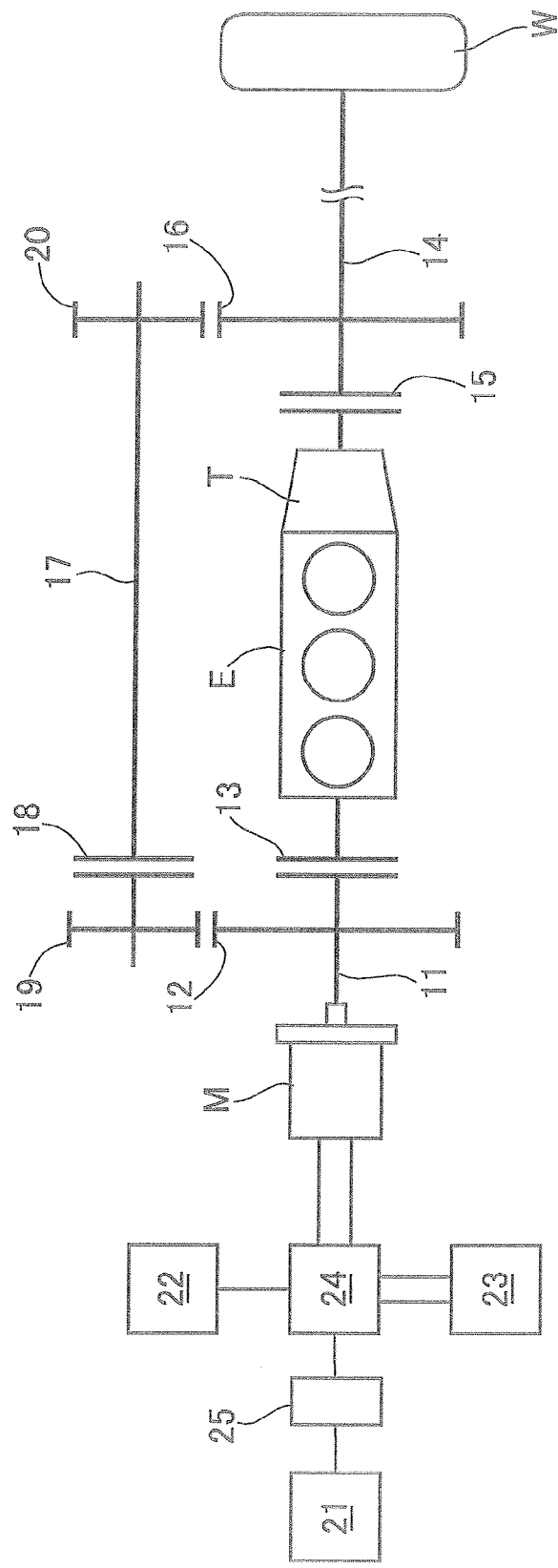
FIG. 1 is a diagram showing a driving force transmission system of a hydraulic hybrid vehicle to which the flow rate control valve of the present invention is applied. (first embodiment)
Figure 2:
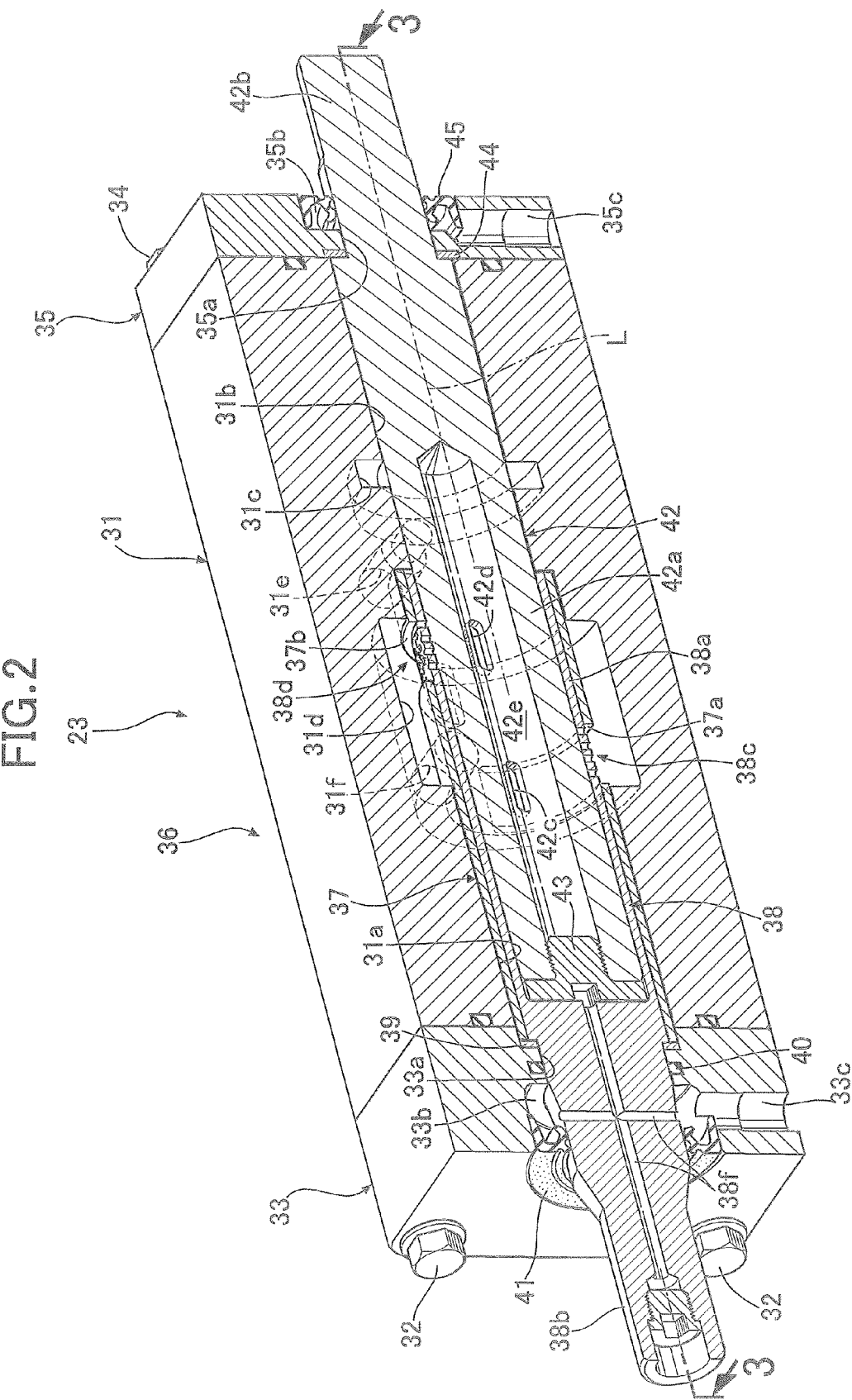
FIG. 2 is a sectional perspective view of the flow rate control valve. (first embodiment)
Figure 3:
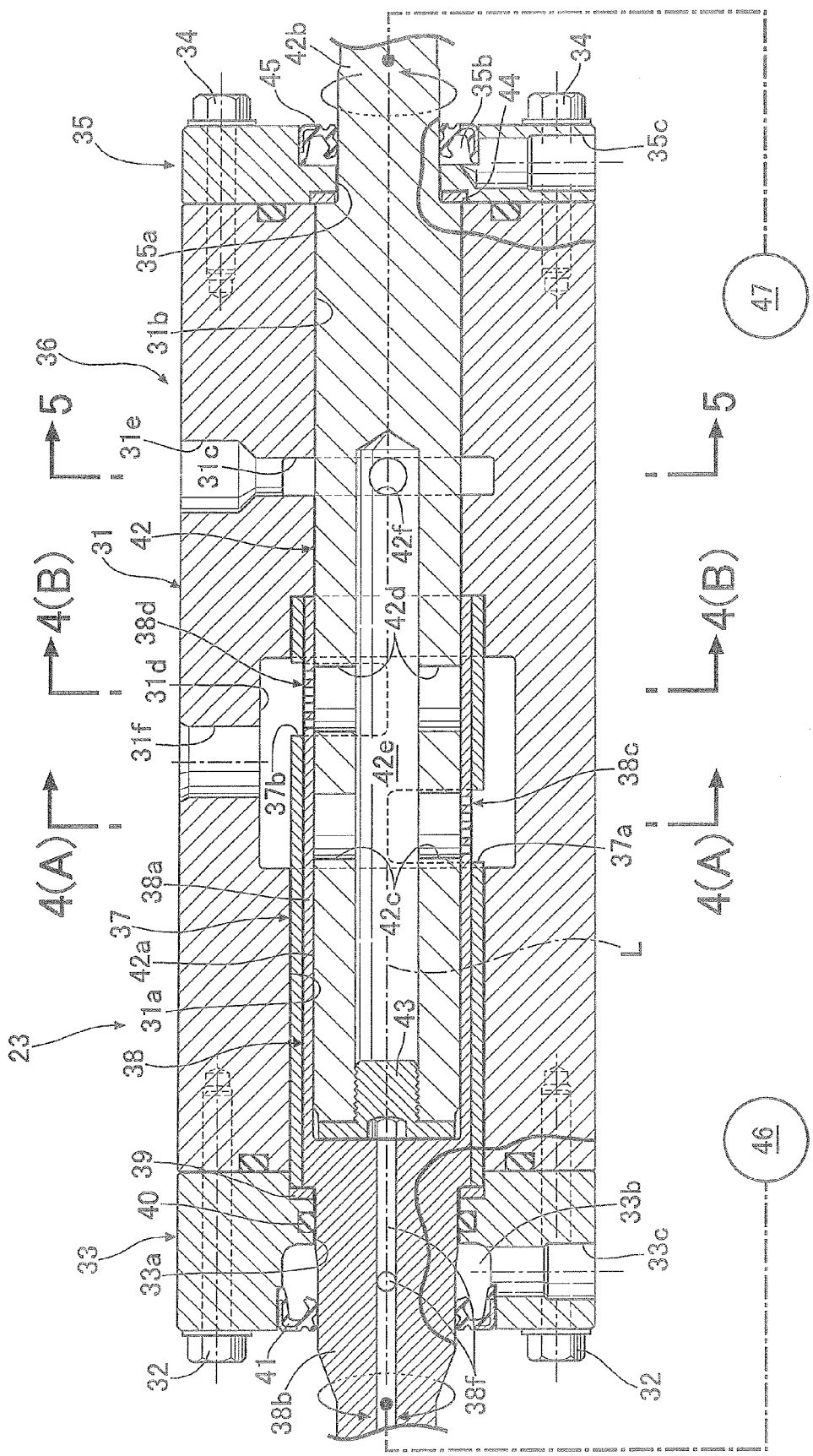
FIG. 3 is a sectional view along line 3-3 in FIG. 2. (first embodiment)

31e Input port
31f Output port
36 Valve housing
37 Sleeve
37a First outlet opening (outlet opening)
37b Second outlet opening (outlet opening)
37c Third outlet opening (outlet opening)
38 Distributor
38c First communication hole group (communication hole group)
38d Second communication hole group (communication hole group)
38g Third communication hole group (communication hole group)
42 Rotor
42c First inlet opening (inlet opening)
42d Second inlet opening (inlet opening)
42e Interior space
42g Third inlet opening (inlet opening)
46 First electric motor (first drive source)
47 Second electric motor (second drive source)
61e Input port
61f Output port
L Axis Best Mode for Carrying Out the Invention

[First Embodiment]

A first embodiment of the present invention is explained below by reference to FIG. 1 to FIG. 9.

As shown in FIG. 1, a hydraulic hybrid vehicle includes a pump/motor M, an engine E, and a transmission T, which are connected in series. For example, a linking shaft 11 connecting the engine E and the pump/motor M, which is formed from a gear motor, is provided with a first gear 12 and a first clutch 13, and an output shaft 14 connecting the transmission T and a driven wheel W is provided with a second clutch 15 and a second gear 16. A bypass shaft 17 bypassing the engine E and the transmission T is provided with a third clutch 18, a third gear 19 meshing with the first gear 12, and a fourth gear 20 meshing with the second gear 16.

The pump/motor M, a tank 21, an accumulator 22, and a flow rate control valve 23 are connected via a switch control valve 24, and the pump/motor M is switched between a state in which it operates as a motor by liquid pressure stored under pressure in the accumulator 22 and a state in which it operates as a pump that is externally driven and stores pressure in the accumulator 22. A radiator 25 for cooling the liquid is provided between the tank 21 and the switch control valve 24. The radiator 25 may be provided between the accumulator 22 and the switch control valve 24.

Therefore, in a state in which the first clutch 13 is engaged and the second clutch 15 and the third clutch 18 are disengaged, the pump/motor M is operated as a motor by means of liquid pressure stored under pressure in the accumulator 22 to thus start the engine E, and the engine E is driven and the pump/motor M is operated as a pump to thus store pressure in the accumulator 22.

When the pump/motor M is driven by means of liquid pressure stored under pressure in the accumulator 22 in a state in which the third clutch 18 is engaged and the first clutch 13 and the second clutch 15 are disengaged, the driving force is transmitted to the driven wheel W via the path: linking shaft 11→first gear 12→third gear 19→third clutch 18→bypass shaft 17→fourth gear 20→second gear 16→output shaft 14, thereby starting or running the vehicle by means of the driving force of the pump/motor M. If the pump/motor M is subjected to regenerative braking in this state, the pump/motor M is operated as a pump by means of driving force transmitted back from the driven wheel W side to thus store pressure in the accumulator 22, thereby recovering kinetic energy of the vehicle as hydraulic energy.

In a state in which the second clutch 15 is engaged and the first clutch 13 and the third clutch 18 are disengaged, the driving force of the engine E is transmitted to the driven wheel W via the second clutch 15 and the output shaft 14, thereby starting or running the vehicle by means of the driving force of the engine E. If the first clutch 13 is further engaged in this state, the pump/motor M is operated as a motor to thus assist the driving force of the engine E with the driving force of the pump/motor M, and the pump/motor M is operated as a pump to thus store pressure in the accumulator 22.

The structure of the flow rate control valve 23 is now explained by reference to FIG. 2 to FIG. 6. The flow rate control valve 23 controls the flow rate of liquid supplied from the accumulator 22 to the pump/motor M when the pump/motor M is operated as a motor, and controls the flow rate of liquid supplied from the pump/motor M to the accumulator 22 when the pump/motor M is operated as a pump.

The flow rate control valve 23 includes a valve housing 36 formed from a center housing 31, a first end housing 33 connected to one end of the center housing 31 via bolts 32, and a second end housing 35 connected to the other end of the center housing 31 via bolts 34. A circular cross-section large diameter hole 31a and a circular cross-section small diameter hole 31b are coaxially formed on an axis L of the center housing 31, an annular input liquid chamber 31c is formed so as to surround the outer periphery of the small diameter hole 31b, and an annular output liquid chamber 31d is formed so as to surround the outer periphery of the large diameter hole 31a. An input port 31e communicating with the input liquid chamber 31c and an output port 31f communicating with the output liquid chamber 31d open on one side of the center housing 31.

A cylindrical sleeve 37 is press fitted into the large diameter hole 31a, which opens on said one end of the center housing 31. Formed in the sleeve 37 so as to face the output liquid chamber 31d are first and second outlet openings 37a and 37b each having a central angle of 180° with the axis L as a center. The first and second outlet openings 37a and 37b have a rectangular shape when the sleeve 37 is in a developed state, and are disposed so as to have phases displaced from each other by 180° and be spaced so as not to overlap one another in the axis L direction.

A distributor 38 includes a cylindrical portion 38a and a shaft portion 38b; the cylindrical portion 38a is relatively rotatably fitted into the inner periphery of the sleeve 37, and the shaft portion 38b extends relatively rotatably through a shaft hole 33a of the first end housing 33. The position in the axis L direction of the cylindrical portion 38a of the distributor 38 is restricted by a shim 39 disposed between itself and the first end housing 33. Formed in the cylindrical portion 38a are first and second communication hole groups 38c and 38d that can overlap with the first and second outlet openings 37a and 37b of the sleeve 37. The first and second communication hole groups 38c and 38d are formed from large numbers of circular communication holes 38e disposed in a staggered manner.

The shaft hole 33a of the first end housing 33 is provided with a seal ring 40 and a mechanical seal 41 for providing sealing between itself and the shaft portion 38b of the distributor 38, a drain chamber 33b formed between the seal ring 40 and the mechanical seal 41 communicating with the exterior of the first end housing 33 via a drain port 33c. Formed in the shaft portion 38b of the distributor 38 is a drain passage 38f for providing communication between a shaft end of a rotor 42 and the drain chamber 33b, thereby preventing a thrust in the axis L direction from acting on the rotor 42.

The rotor 42 includes a cylindrical portion 42a and a shaft portion 42b, the cylindrical portion 42a having an open end closed by a plug 43 and being relatively rotatably fitted into the inner periphery of the distributor 38, and the shaft portion 42b relatively rotatably extending through a shaft hole 35a of the second end housing 35. The position in the axis L direction of the cylindrical portion 42a of the rotor 42 is restricted by a shim 44 disposed between itself and the second end housing 35. Formed in the cylindrical portion 42a are two pairs, having a phase difference of 180°, of first and second inlet openings 42c and 42d that can communicate with the first and second communication hole groups 38c and 38d of the distributor 38 respectively. The first and second inlet openings 42c and 42d are formed into a slit shape extending in the axis L direction, and the width in the axis L direction coincides with the width in the axis L direction of the first and second outlet openings 37a and 37b and the first and second communication hole groups 38c and 38d.

The shaft hole 35a of the second end housing 35 is provided with a mechanical seal 45 for providing sealing between itself and the shaft portion 42b of the rotor 42, a drain chamber 35b formed between the center housing 31 and the mechanical seal 45 communicating with the exterior of the second end housing 35 via a drain port 35c. An interior space 42e of the rotor 42 communicates with the input liquid chamber 31c of the center housing 31 via a liquid hole 42f.

The shaft portion 38b of the distributor 38 is connected to a first electric motor 46 and is driven to rotate through 180° between a position at which the first and second communication hole groups 38c and 38d completely overlap the first and second outlet openings 37a and 37b of the sleeve 37 and a position at which they do not overlap at all. The shaft portion 42b of the rotor 42 is connected to a second electric motor 47 and driven to rotate at a variable speed.

The operation of the flow rate control valve 23 having the above-mentioned arrangement is now explained.

Figure 4:
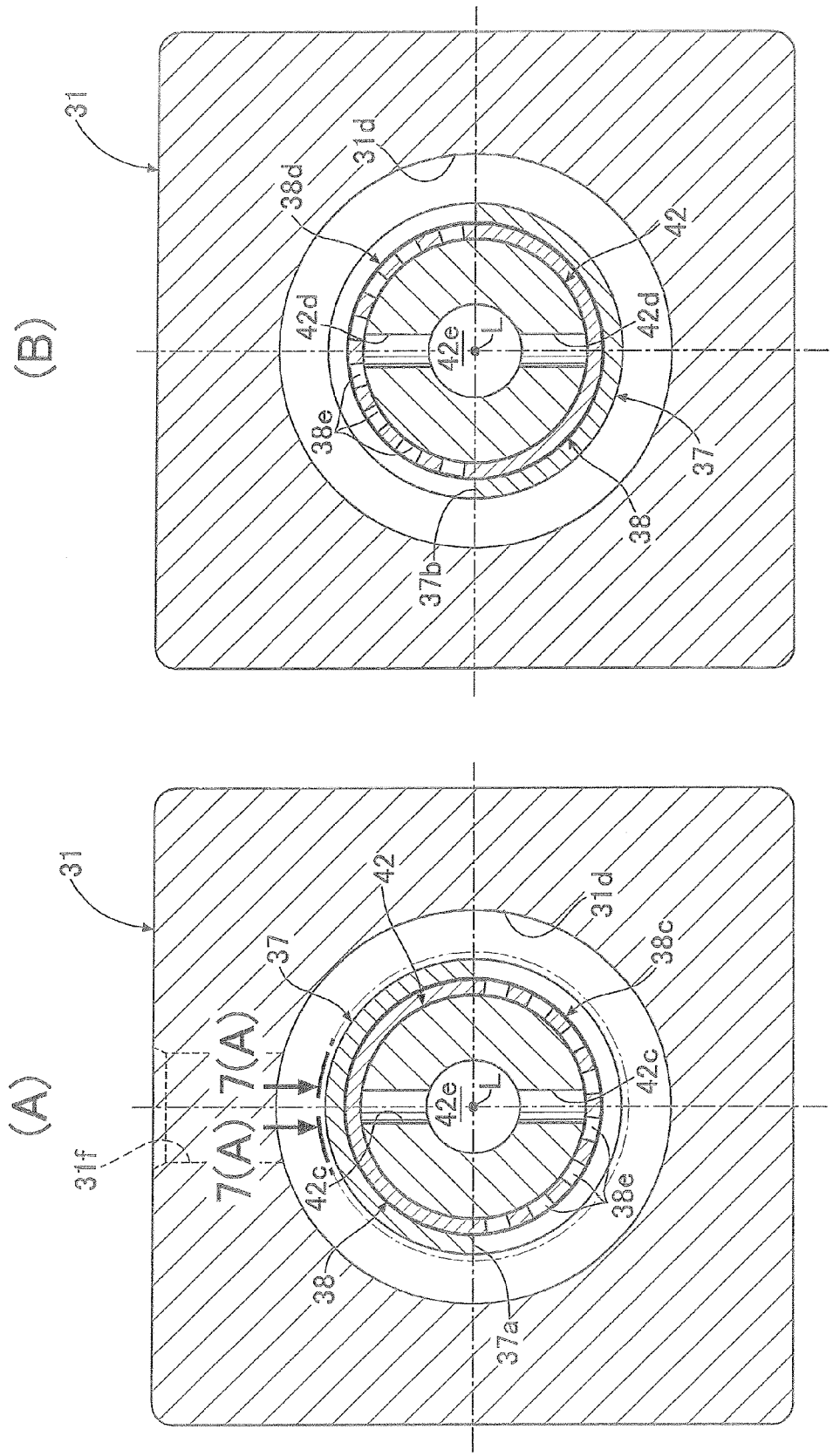
FIG. 4 is a sectional view along line 4-4 in FIG. 3. (first embodiment)
Figure 5:
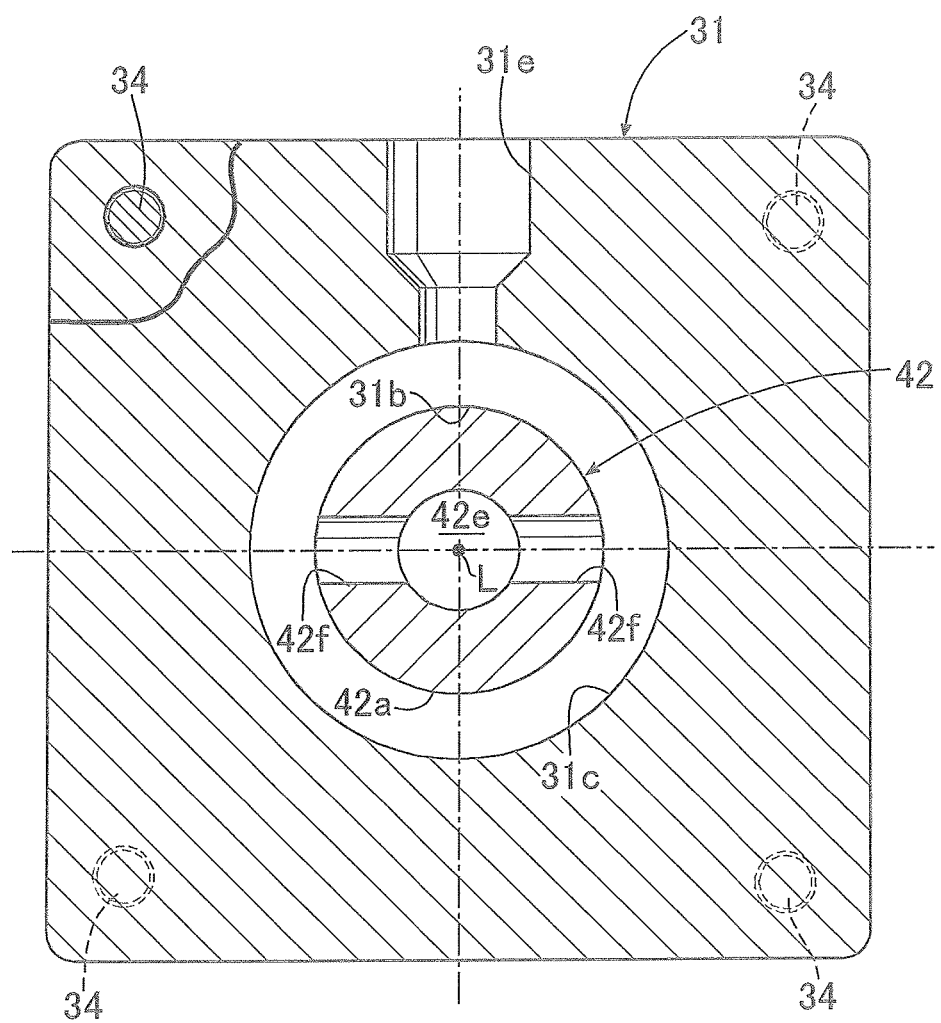
FIG. 5 is a sectional view along line 5-5 in FIG. 3. (first embodiment)
Figure 6:
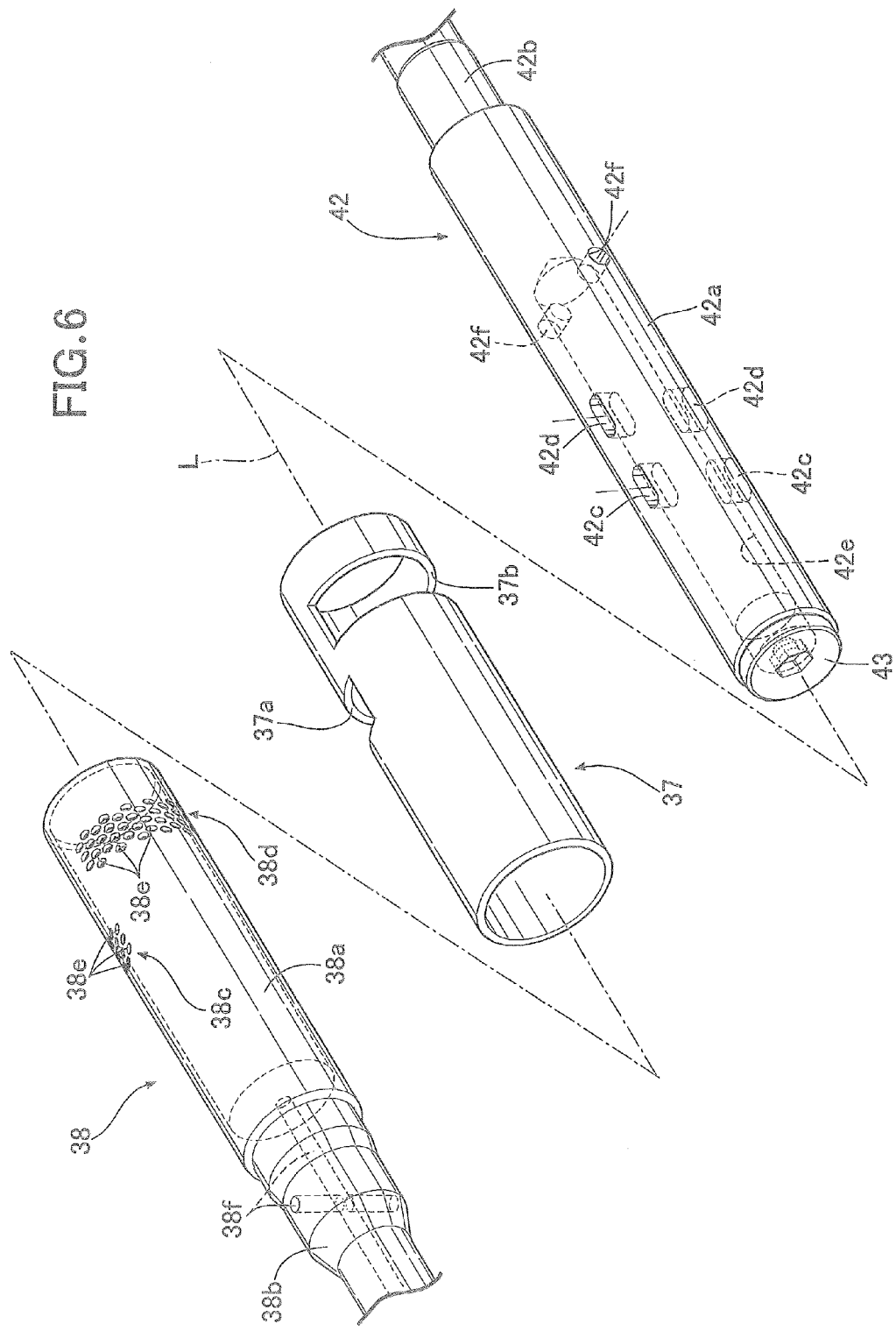
FIG. 6 is an exploded perspective view of a sleeve, a distributor, and a rotor. (first embodiment)
Figure 7:
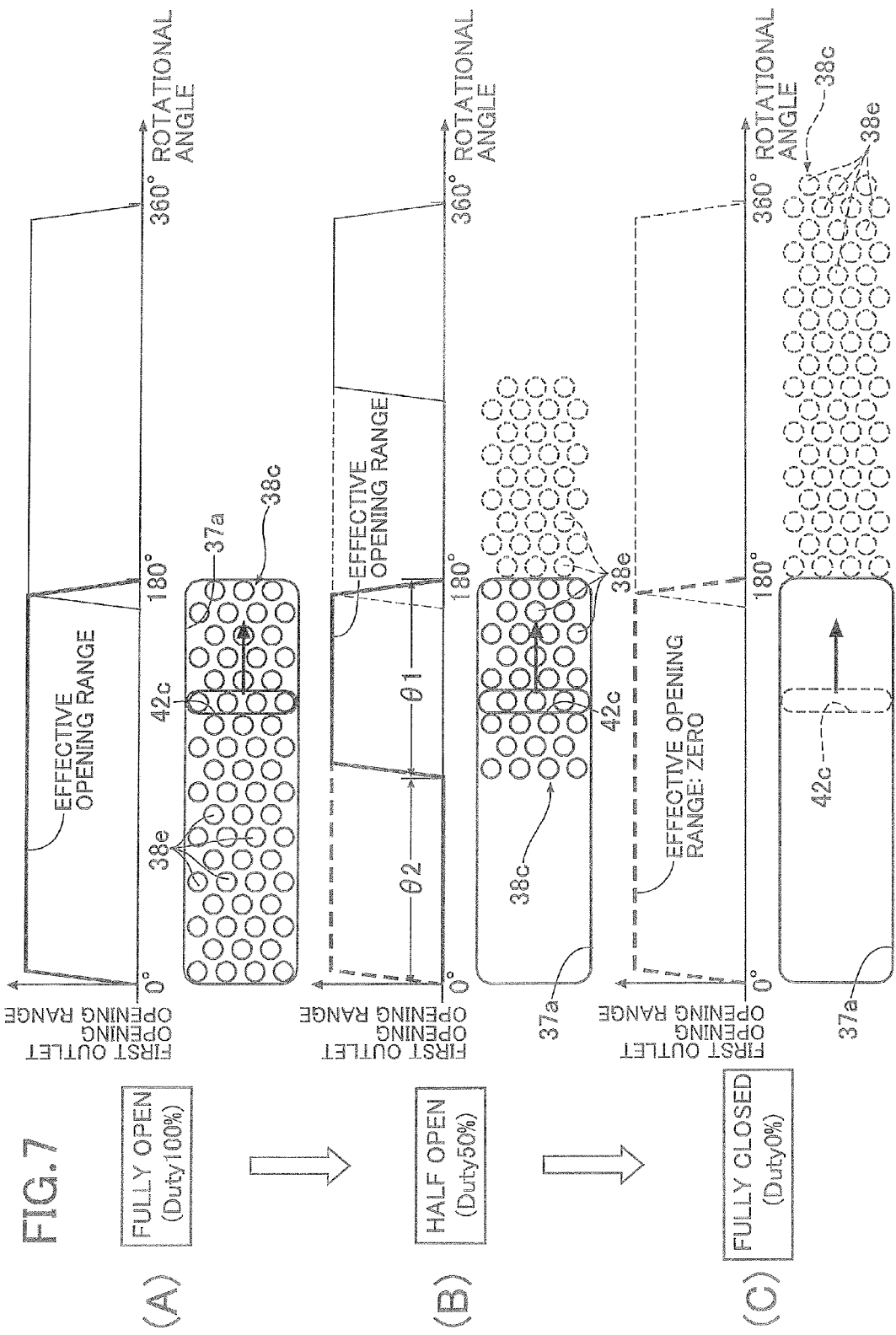
FIG. 7 is a developed view along line 7-7 in FIG. 4. (first embodiment)

FIG. 7 is a developed view along line 7-7 in FIG. 4 and shows a state in which the sleeve 37 fixed to the valve housing 36, the cylindrical portion 38a of the distributor 38, which is rotated relative to the sleeve 37 by the first electric motor 46 through a range of 0° to 180°, and the cylindrical portion 42a of the rotor 42, which is rotated relative to the sleeve 37 and the distributor 38 by the second electric motor 47 at a variable speed, are developed in the circumferential direction through 360°; FIG. 7 (A) corresponds to a state in which the duty ratio=100% (fully open), FIG. 7 (B) corresponds to a state in which the duty ratio=50% (half open), and FIG. 7 (C) corresponds to a state in which the duty ratio=0% (fully closed).

The first outlet opening 37a of the sleeve 37 opens over a range of 0° to 180° of its central angle of 360°; in a state in which the duty ratio is 100% the first communication hole group 38c of the distributor 38 overlaps the first outlet opening 37a of the sleeve 37 throughout the entire region, and the effective open range of the first outlet opening 37a of the sleeve 37 is therefore 0° to 180°. In a state in which the duty ratio is 50%, the distributor 38 rotates relative to the sleeve 37 through 90° from left to right in the figure, the first communication hole group 38c of the distributor 38 overlaps the first outlet opening 37a of the sleeve 37 through half of the entire region, and the effective open range of the first outlet opening 37a of the sleeve 37 is therefore 90° to 180°. In a state in which the duty ratio is 0%, the distributor 38 rotates relative to the sleeve 37 through 180° from left to right in the figure, the first communication hole group 38c of the distributor 38 does not overlap the first outlet opening 37a at all, and the effective open range of the first outlet opening 37a of the sleeve 37 is therefore zero.

When the rotor 42 is rotated by the second electric motor 47 relative to the sleeve 37 and the distributor 38, the two first inlet openings 42c and 42c provided in the rotor 42 at a phase difference of 180° move from the left side to the right side in the figure. FIG. 7 shows only one of the two first inlet openings 42c and 42c.

When the pump/motor M is operated as a motor, the input port 31e of the center housing 31 is connected to the accumulator 22, and the output port 31f of the center housing 31 is connected to the tank 21. Therefore, high pressure liquid of the accumulator 22 is supplied to the interior space 42e of the rotor 42 via the path: input port 31e of center housing 31→input liquid chamber 31c of center housing 31→liquid hole 42f of rotor 42. When the first inlet opening 42c facing the interior space 42e of the rotor 42 overlaps the effective open range of the first outlet opening 37a of the sleeve 37, the liquid of the interior space 42e is returned to the tank 21 via the path: first inlet opening 42c of rotor 42→first communication hole group 38c of distributor 38→first outlet opening 37a of sleeve 37→output liquid chamber 31d of center housing 31→output port 31f of center housing 31, and the pump/motor M operates as a motor.

In this process, since the first and second communication hole groups 38c and 38d of the distributor 38 are formed from large numbers of communication holes 38e, which are separated from each other, it is possible to prevent the liquid from short circuiting in the circumferential direction via communication holes 38e that do not face the first and second outlet openings 37a and 37b of the sleeve 37.

Liquid that has passed between the inner periphery of the sleeve 37 and the outer periphery of the distributor 38 and has further passed through the seal ring 40 is discharged to the exterior of the valve housing 36 via the drain chamber 33b and the drain port 33c of the first end housing 33. Furthermore, liquid that has leaked between the inner periphery of the small diameter hole 31b of the center housing 31 and the outer periphery of the rotor 42 is discharged to the exterior of the valve housing 36 via the drain chamber 35b and the drain port 35c of the second end housing 35.

In FIG. 7 (B), the sum of a load period $\theta 1$ in which the input port 31e and the output port 31f communicate and a no-load period $\theta 2$ in which the input port 31e and the output port 31f do not communicate is 180°, and $\theta 1/(\theta 1+\theta 2)$ is the duty ratio. In this case, $\theta 1=\theta 2=90°$, and the duty ratio=50%. This duty ratio can be controlled so as to be in a range of 0% to 100% by changing the rotational angle of the distributor 38 by the first electric motor 46 in a range of 0° to 180°. For example, in the state of FIG. 7 (A), $\theta 1=180°$, $\theta 2=0°$, and the duty ratio=100% (fully open). Furthermore, in the state of FIG. 7 (C), $\theta 1=0°$, $\theta 2=180°$, and the duty ratio=0% (fully closed).

The above-mentioned first inlet opening 42c, first communication hole group 38c, and first outlet opening 37a of the flow rate control valve 23 output a duty waveform when the rotational angle of the rotor 42 is in a range of 0° to 180° and do not output a duty waveform when the rotational angle of the rotor 42 is in a range of 180° to 360°, and since the second inlet opening 42d adjacent to the first inlet opening 42c and the second communication hole group 38d and second outlet opening 37b having phases that are displaced relative to those of the first communication hole group 38c and first outlet opening 37a by 180° output the same duty waveform when the rotational angle of the rotor 42 is in a range of 180° to 360°, the flow rate control valve 23 outputs a duty waveform twice per rotation of the rotor 42. Therefore, when the speed at which the rotor 42 is rotated by means of the second electric motor 47 is defined as N, the frequency of the duty waveform outputted by the flow rate control valve 23 becomes 2N, and it is possible to obtain a high duty frequency while keeping the rotational speed of the second electric motor 47 low.

As described above, in accordance with the present embodiment, since the flow rate of liquid supplied from the accumulator 22 to the pump/motor M is duty controlled by the flow rate control valve 23, compared with a case in which the flow rate of liquid is controlled by a throttle valve, heat loss can be reduced to thus give high efficiency. In this process, selecting an optimum duty frequency by adjusting the rotational speed of the rotor 42 enables higher efficiency to be obtained. Moreover, since the liquid pressure of the input liquid chamber 31c and the output liquid chamber 31d does not generate a thrust load on the distributor 38 and the rotor 42 in the axis L direction, it becomes unnecessary to support the distributor 38 and the rotor 42 so as to withstand such a thrust load, and it is thus possible to simplify the structure and cut the weight and cost.

Furthermore, since the first and second outlet openings 37a and 37b of the sleeve 37 each have a central angle of 180°, if they overlapped one another in the axis L direction, the first and second outlet openings 37a and 37b would communicate with each other to thus divide the sleeve 37 into two members, but since they are displaced in the axis L direction it is possible to form the sleeve 37 from one member. Similarly, since the first and second communication hole groups 38c and 38d of the distributor 38 each have a central angle of 180°, if they overlapped one another in the axis L direction, the first and second communication hole groups 38c and 38d would overlap one another to thus degrade the rigidity of the distributor 38, but since they are displaced in the axis L direction it is possible to ensure the rigidity of the distributor 38.

A case in which the pump/motor M is operated as a motor is explained above, but the flow rate control valve 23 carries out PWM control of liquid flow rate in the same manner when the pump/motor M is operated as a pump.

The structure of a liquid pressure control circuit for switching the operation of the pump/motor M between a motor and a pump is now explained.

Figure 8:
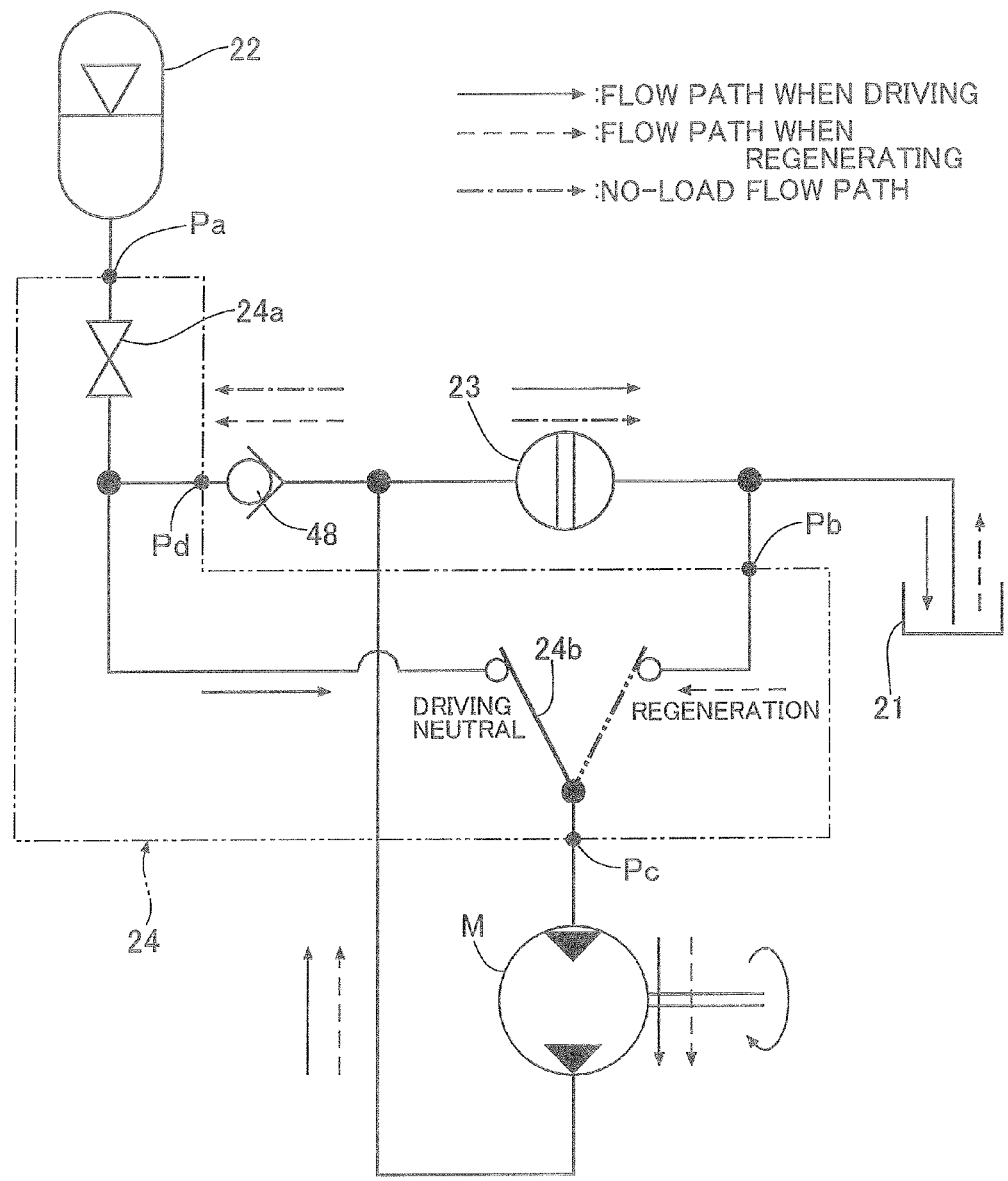
FIG. 8 is a diagram showing an equivalent circuit of a drive circuit for a pump/motor. (first embodiment)

FIG. 8 shows an equivalent circuit of the liquid pressure control circuit, the switch control valve 24 including four ports Pa, Pb, Pc, and Pd, a cut-off valve 24a, and a switch valve 24b. The port Pa is connected to the accumulator 22, the port Pb is connected to the tank 21, the port Pc is connected to the pump/motor M, and the port Pd is connected to the downstream side of a check valve 48. The cut-off valve 24a is disposed between the port Pa and the port Pd, and the port Pc is selectively connected to the ports Pa and Pd or the port Pb via the switch valve 24b. The upstream side of the check valve 48 is connected to the pump/motor M and is also connected to the port Pb and the tank 21 via the flow rate control valve 23.

Figure 9:
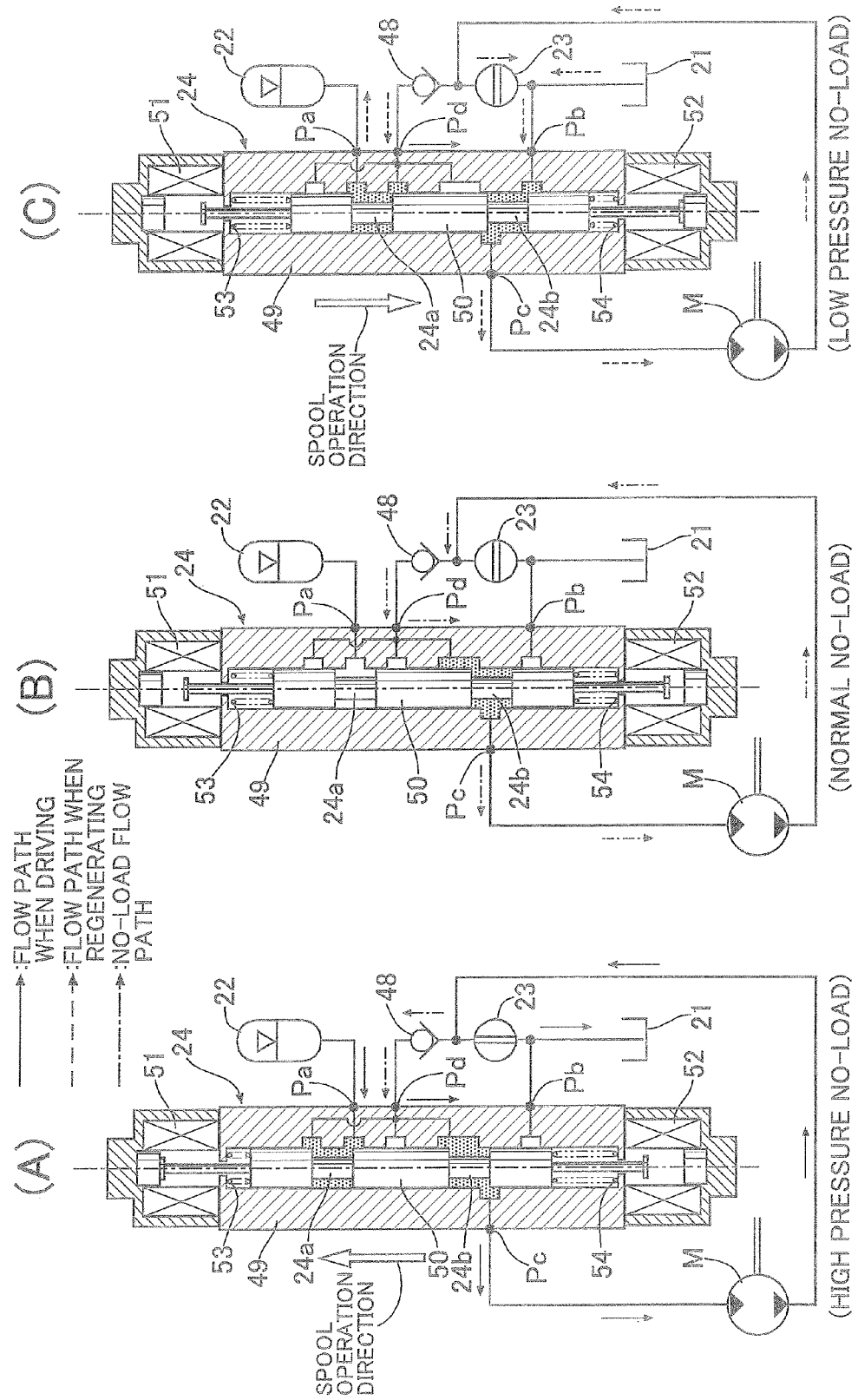
FIG. 9 is a diagram showing a drive circuit for the pump/motor. (first embodiment)

FIG. 9 is a liquid pressure circuit embodying the switch control valve 24 of the equivalent circuit of FIG. 8; the switch control valve 24 is formed from a spool 50 slidably fitted into a valve housing 49, two solenoids 51 and 52 driving the spool 50, and return springs 53 and 54 urging the spool 50 to a neutral position.

As shown in FIG. 8 and FIG. 9 (A), when the pump/motor M is operated as a motor, the solenoid 51 is energized and the solenoid 52 is de-energized to thus move the spool 50 upward in the figure, the cut-off valve 24a is opened, and the switch valve 24b is switched toward the drive/neutral side. As a result, when the duty ratio of the flow rate control valve 23 is 100%, the liquid of the accumulator 22 flows via the path: port Pa→cut-off valve 24a→switch valve 24b→port Pc→pump/motor M→flow rate control valve 23→tank 21, thus enabling the pump/motor M to be driven.

When the duty ratio of the flow rate control valve 23 is 0%, liquid that has passed through the pump/motor M is blocked by the flow rate control valve 23 and cannot flow into the tank 21, and the liquid of the accumulator 22 therefore circulates in a closed no-load circuit via the path: port Pa→cut-off valve 24a→switch valve 24b→port Pc→pump/motor M→check valve 48→port Pd→switch valve 24b. In this process, since the liquid that is flowing in the no-load circuit is high pressure liquid of the accumulator 22 (high pressure no-load), it is possible to suppress effectively the occurrence of cavitation.

When the duty ratio of the flow rate control valve 23 is larger than 0% and smaller than 100%, during a duty ON period when the flow rate control valve 23 is open the pump/motor M is in a load state in which a driving force is generated, and during a duty OFF period when the flow rate control valve 23 is closed the pump/motor M is in a no-load state in which no driving force is generated.

As shown in FIG. 8 and FIG. 9 (B), when the pump/motor M is operated as neither a motor nor a pump (neutral state), both the solenoid 51 and the solenoid 52 are de-energized to thus put the spool 50 into a neutral position, the cut-off valve 24a is closed, and the switch valve 24b is switched toward the drive/neutral side. As a result, the closed no-load circuit: pump/motor M→check valve 48→port Pd→switch valve 24b→port Pc→pump/motor M is formed, and the pump/motor M rotates without load.

As shown in FIG. 8 and FIG. 9 (C), when the pump/motor M is operated as a pump, the solenoid 51 is de-energized and the solenoid 52 is energized to thus move the spool 50 downward in the figure, the cut-off valve 24a is opened, and the switch valve 24b is switched toward the regeneration side. As a result, when the duty ratio of the flow rate control valve 23 is 0%, since liquid pressurized by the pump/motor M cannot pass through the flow rate control valve 23, the liquid of the tank 21 flows via the path: port Pb→switch valve 24b→port Pc→pump/motor M→check valve 48→port Pd→cut-off valve 24a→port Pa→accumulator 22, and pressure can thereby be stored in the accumulator 22.

When the duty ratio of the flow rate control valve 23 is 100%, since liquid that has passed through the pump/motor M can pass through the flow rate control valve 23 without load, the liquid of the tank 21 circulates in a closed no-load circuit via the path: port Pb→switch valve 24b→port Pc→pump/motor M→flow rate control valve 23→port Pb. In this process, since the liquid that is flowing in the no-load circuit is low pressure liquid of the tank 21 (low pressure no-load), it is possible to prevent the liquid from leaking and to reduce the operating resistance of the pump/motor M and the flow rate control valve 23.

When the duty ratio of the flow rate control valve 23 is larger than 0% and smaller than 100%, during a duty OFF period when the flow rate control valve 23 is closed the pump/motor M is in a load state in which a liquid pressure is generated, and during a duty ON period when the flow rate control valve 23 is open the pump/motor M is in a no-load state in which no liquid pressure is generated.

In the present embodiment, since the pump/motor M is used as a drive source for a hydraulic hybrid vehicle, although the rotational direction is the same both when the pump/motor M operates as a motor (when driving) and when it operates as a pump (when regeneratively braking), reversing the connective relationship between the tank 21 and the accumulator 22 by means of the switch control valve 24 enables driving and regenerative braking of the pump/motor M to be carried out without problem while requiring no mechanism for reversing the rotational direction of the pump/motor M. Furthermore, not only is it possible to carry out switching between driving, regeneration, and neutral with respect to the pump/motor M by means of one switch control valve 24, but it is also possible to automatically form a high pressure no-load circuit when the pump/motor M is driving and to automatically form a low pressure no-load circuit when the pump/motor M is regeneratively braking.

[Second and Third Embodiments]

Second and third embodiments of the present invention are now explained by reference to FIG. 10.

Figure 10:
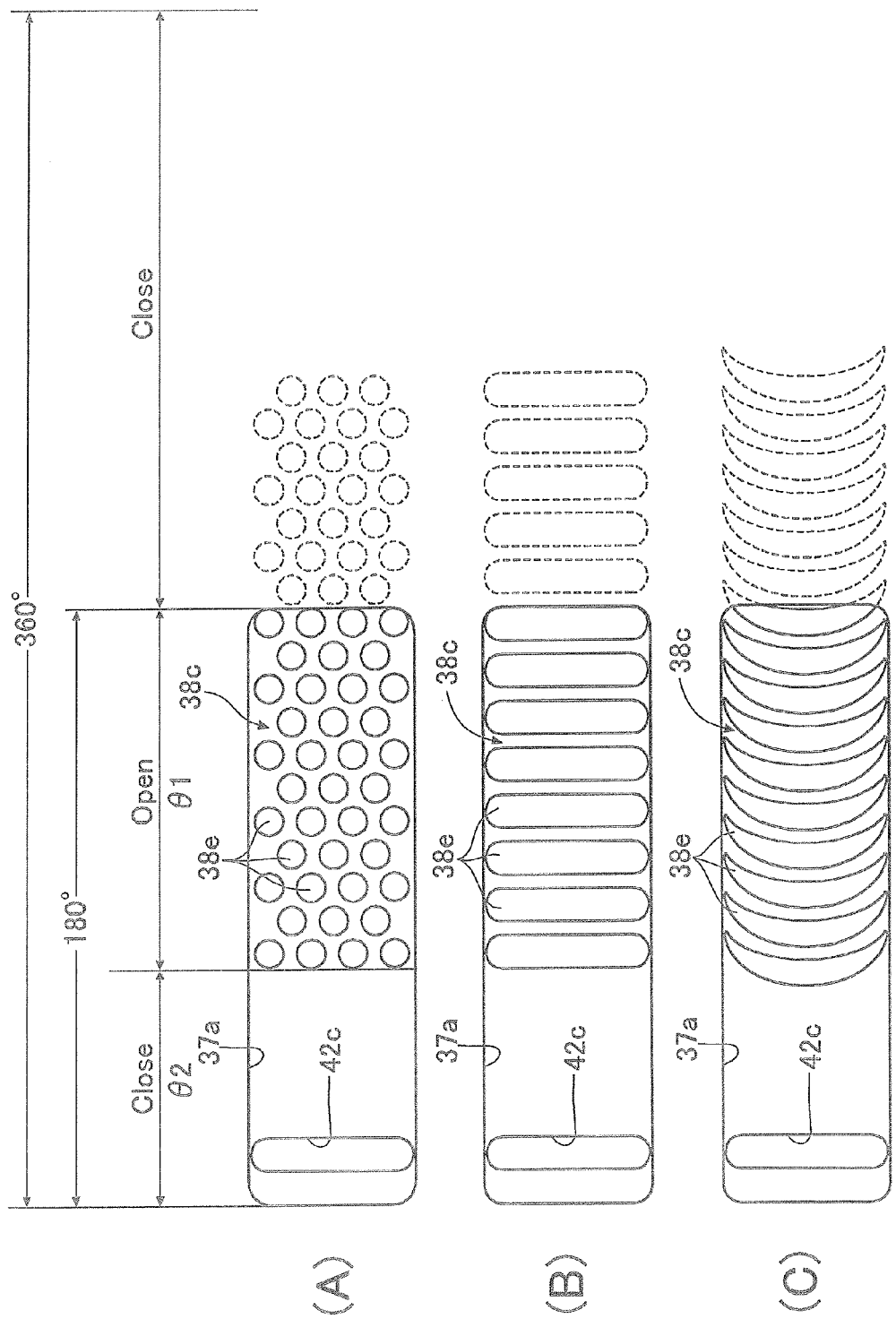
FIG. 10 is a diagram showing the shape of communication holes of a distributor. (second, third embodiments)

The first and second communication hole groups 38c and 38d of the distributor 38 of the first embodiment are formed from a large number of circular communication holes 38e disposed in the axis L direction and the circumferential direction of the distributor 38 (see FIG. 10 (A)), but first and second communication hole groups 38c and 38d of the second embodiment are formed by providing a large number of communication holes 38e in a row in the circumferential direction, the communication holes 38e having the same shape as that of first and second inlet openings 42c and 42d of a rotor 42 (that is, a slit shape that is narrow and long in an axis L direction of a distributor 38) (see FIG. 10 (B)). In accordance with this embodiment, compared with the first embodiment, it is possible to increase the total opening area of the first and second communication hole groups 38c and 38d, thereby decreasing the resistance to circulation of liquid.

Furthermore, with regard to first and second communication hole groups 38c and 38d of the third embodiment, the shape of the communication holes 38e of the second embodiment is changed from the narrow and long slit shape into a crescent shape (see FIG. 10 (C)). In accordance with this embodiment, degradation of the rigidity of the distributor 38 due to the first and second communication hole groups 38c and 38d being formed can be minimized while decreasing the resistance to circulation of liquid.

[Fourth Embodiment]

Figure 11:
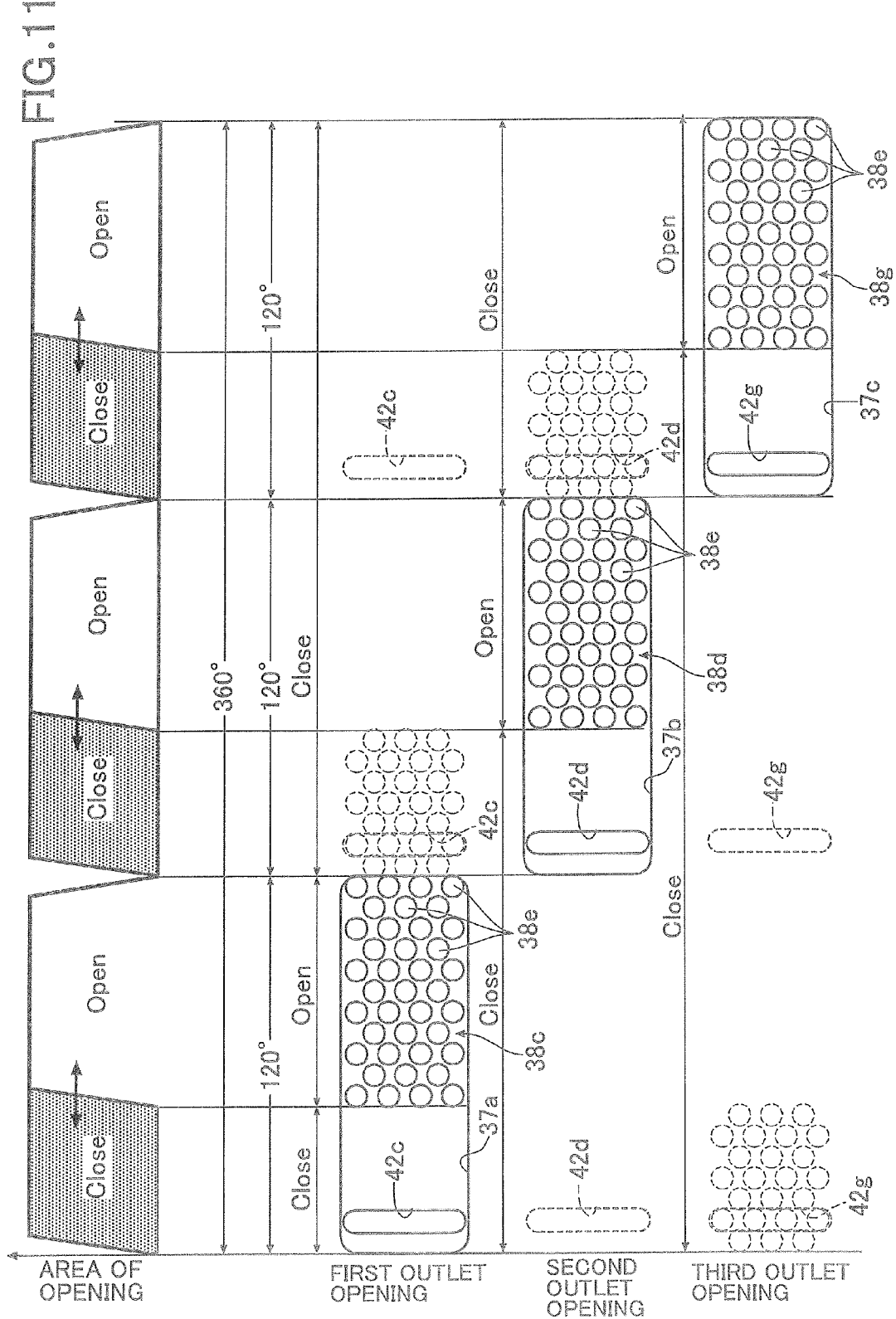
FIG. 11 is a view corresponding to FIG. 7. (fourth embodiment)

A fourth embodiment of the present invention is now explained by reference to FIG. 11.

In the above-mentioned first to third embodiments, the first and second outlet openings 37a and 37b of the sleeve 37 each have a central angle of 180°, the first and second communication hole groups 38c and 38d of the distributor 38 each have a central angle of 180°, and the two pairs of first and second inlet openings 42c and 42d of the rotor 42 each have a phase difference of 180°. On the other hand, in the fourth embodiment, a sleeve 37 includes first to third outlet openings 37a, 37b, and 37c each having a central angle of 120°, a distributor 38 includes first to third communication hole groups 38c, 38d, and 38g each having a central angle of 120°, and a rotor 42 includes three sets of first to third inlet openings 42c, 42d, and 42g each having a phase difference of 120°.

A flow rate control valve 23 therefore can output three cycles of duty waveform per rotation of the rotor, and it is possible to obtain a higher duty frequency while keeping the rotational speed of a second drive source low. Furthermore, when the flow rate control valve 23 is fully closed (duty ratio=0%), compared with the first to third embodiments, it is possible to prevent liquid from short circuiting in the circumferential direction by passing through a gap between the outer peripheral face of the distributor 38 and the inner peripheral face of the sleeve 37.

[Fifth Embodiment]

Figure 12:
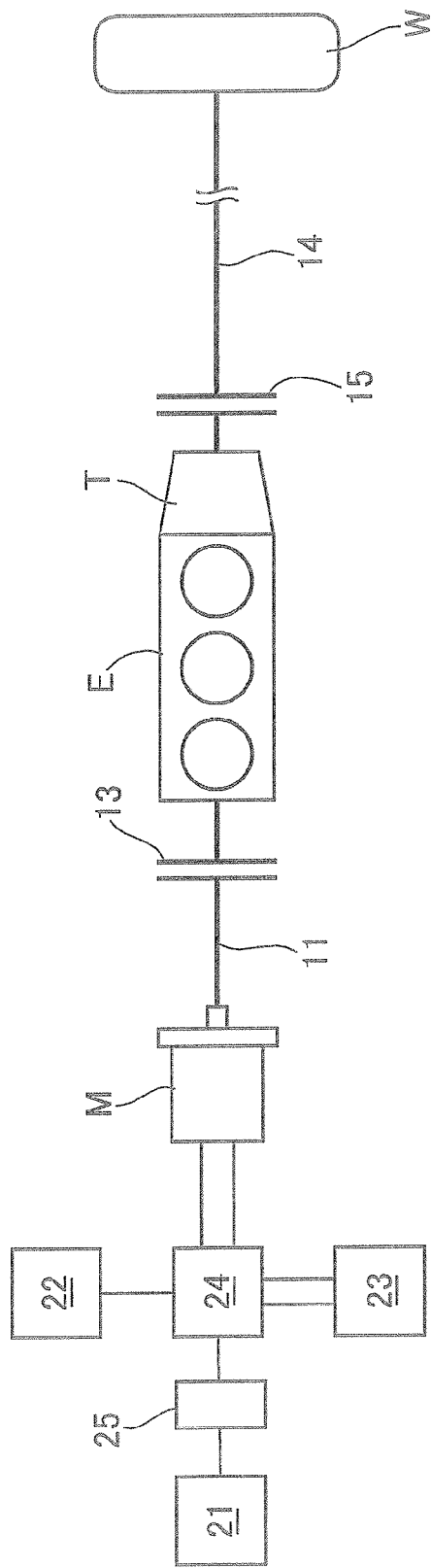
FIG. 12 is a diagram showing a driving force transmission system of a hydraulic hybrid vehicle to which the flow rate control valve of the present invention is applied. (fifth embodiment)

A fifth embodiment of the present invention is now explained by reference to FIG. 12.

In the fifth embodiment, the first gear 12, the second gear 16, the third gear 19, the fourth gear 20, the bypass shaft 17, and the third clutch 18 of the first embodiment (see FIG. 1) are omitted. In accordance with this embodiment, the structure becomes simple, but drag from the friction of an engine E occurs when regeneration is carried out by a pump/motor M.

[Sixth Embodiment]

Figure 13:
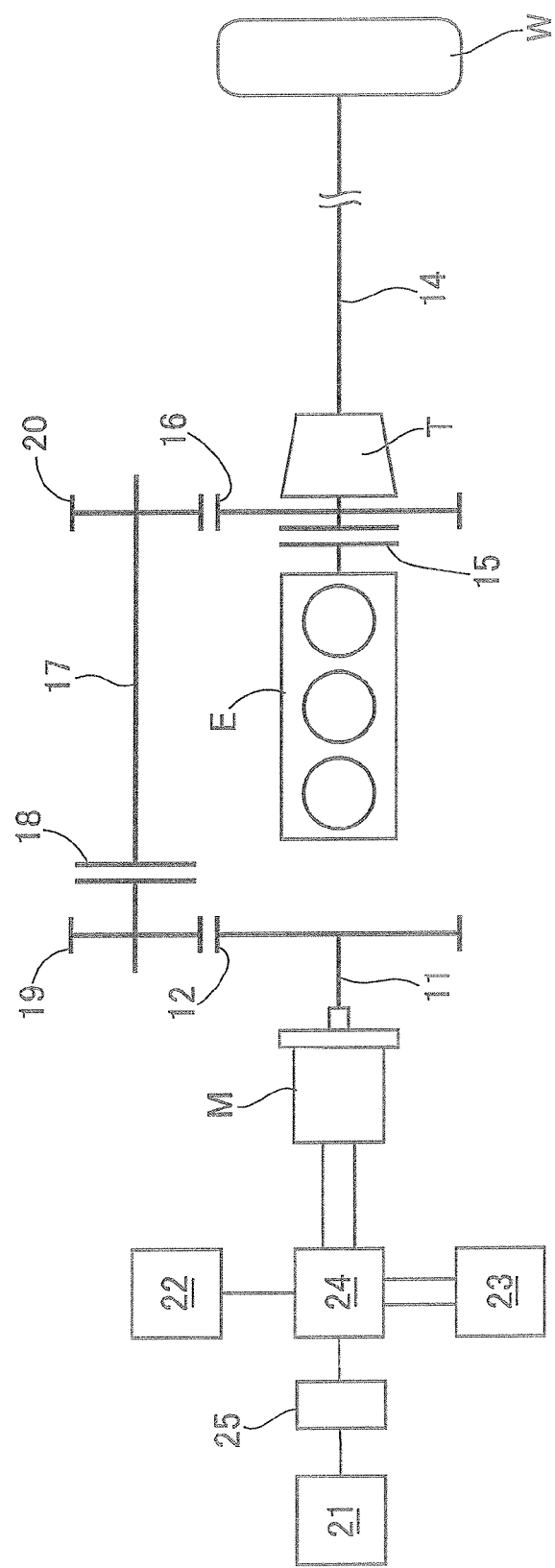
FIG. 13 is a diagram showing a driving force transmission system of a hydraulic hybrid vehicle to which the flow rate control valve of the present invention is applied. (sixth embodiment)

A sixth embodiment of the present invention is now explained by reference to FIG. 13.

In the sixth embodiment, the second clutch 15 and the second gear 16 of the first embodiment (see FIG. 1) are disposed between an engine E and a transmission T, the first clutch 13 is omitted, and a pump/motor M and the engine E are isolated from each other. In accordance with this embodiment, in addition to the operational effects of the first embodiment, freely controlling the reduction ratio between the pump/motor M and the driven wheel W by means of the transmission T enables driving and regeneration to be carried out efficiently by the pump/motor M.

[Seventh Embodiment]

Figure 14:
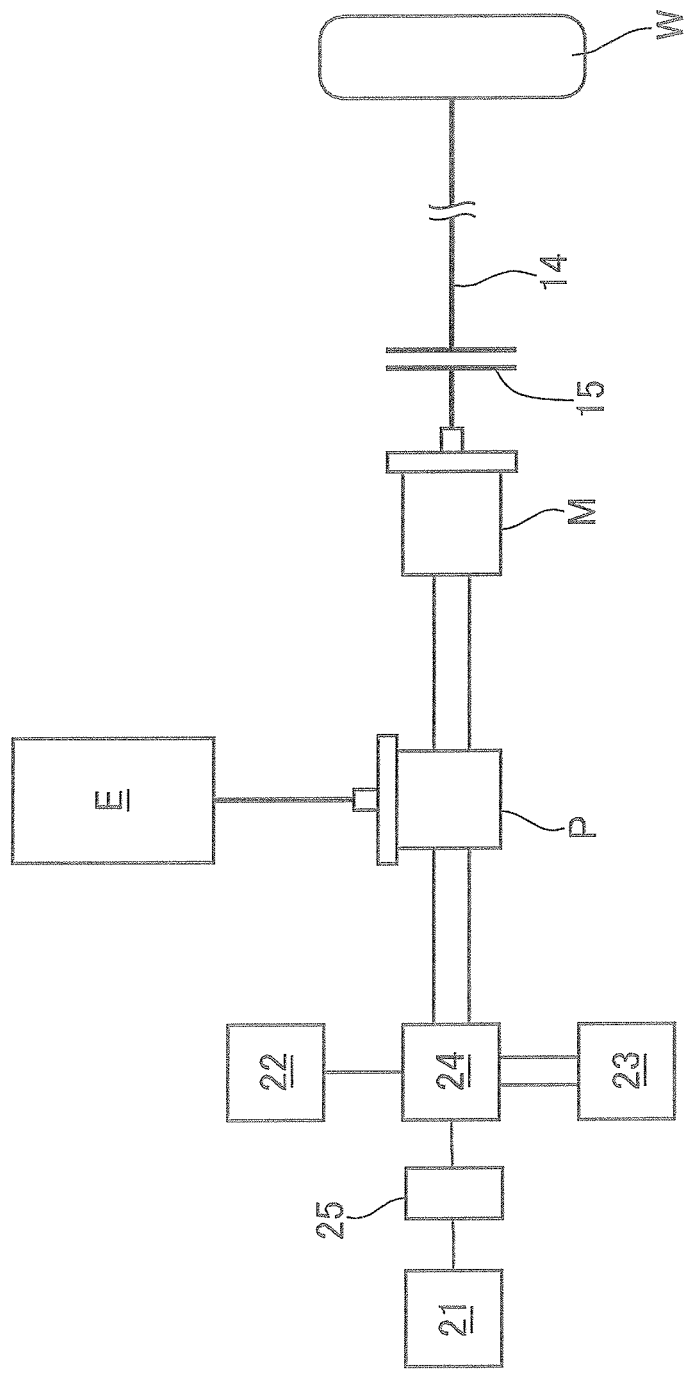
FIG. 14 is a diagram showing a driving force transmission system of a hydraulic hybrid vehicle to which the flow rate control valve of the present invention is applied. (seventh embodiment)

A seventh embodiment of the present invention is now explained by reference to FIG. 14.

The seventh embodiment includes a pump/motor M and a hydraulic pump P; the pump/motor M is connected to a driven wheel W and is used exclusively for driving/regeneration, and the hydraulic pump P, which is connected to an engine E that is used exclusively for generation of liquid pressure, generates liquid pressure for driving the pump/motor M or liquid pressure for storing pressure in an accumulator 22. In accordance with this embodiment, the engine E is run at a fixed point, thereby enabling fuel economy to be improved and emissions to be reduced.

[Eighth Embodiment]

Figure 15:
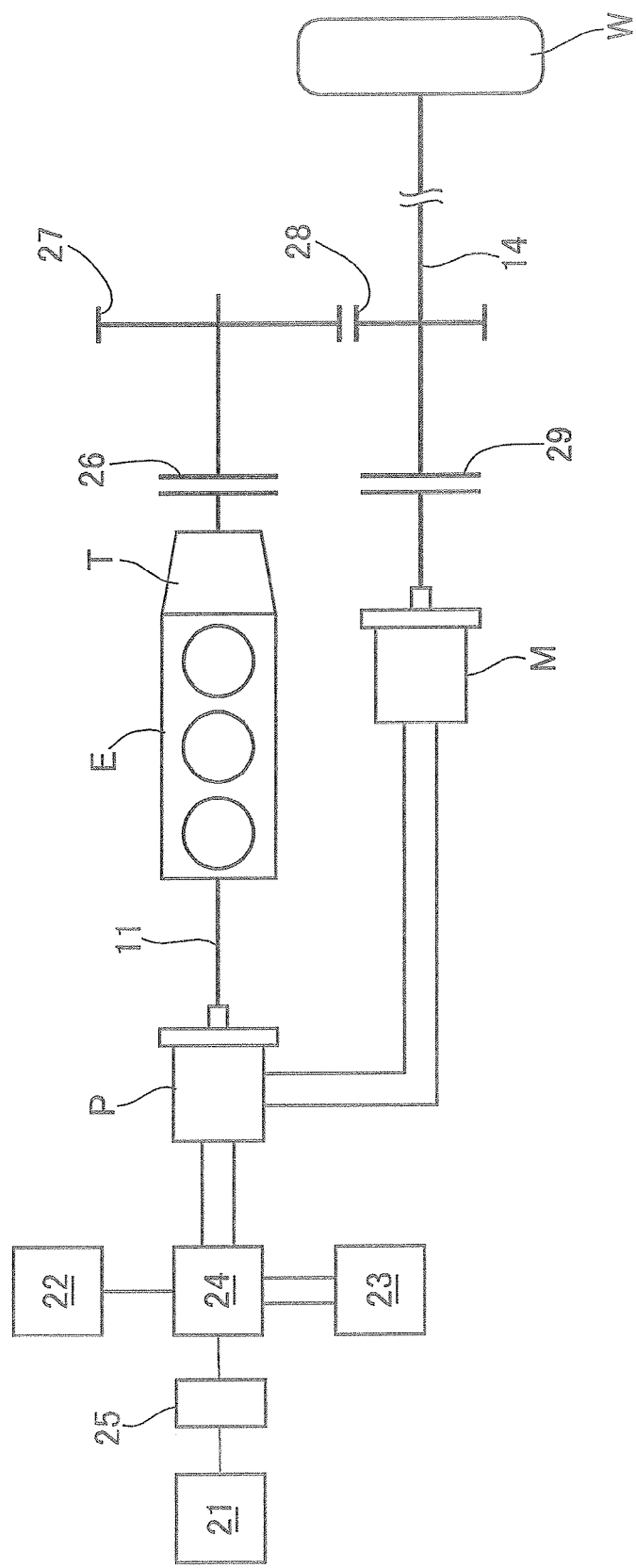
FIG. 15 is a diagram showing a driving force transmission system of a hydraulic hybrid vehicle to which the flow rate control valve of the present invention is applied. (eighth embodiment)

An eighth embodiment of the present invention is now explained by reference to FIG. 15.

The eighth embodiment also includes a pump/motor M and a hydraulic pump P, an engine E is connected to an output shaft 14 via a clutch 26, a gear 27, and a gear 28, the pump/motor M is also connected to the output shaft 14 via a clutch 29, and the hydraulic pump P is connected directly to the engine E. In accordance with this embodiment, the engine E is run at a fixed point in a state in which the clutch 26 is disengaged to thus drive the hydraulic pump P, and the pump/motor M is driven for traveling by means of liquid pressure generated by the hydraulic pump P, thereby enabling fuel economy to be improved and emissions to be reduced. It is of course possible to carry out traveling by means of the engine E on its own, traveling by means of the pump/motor M on its own, and traveling by cooperation of the engine E and the pump/motor M.

[Ninth Embodiment]

Figure 16:
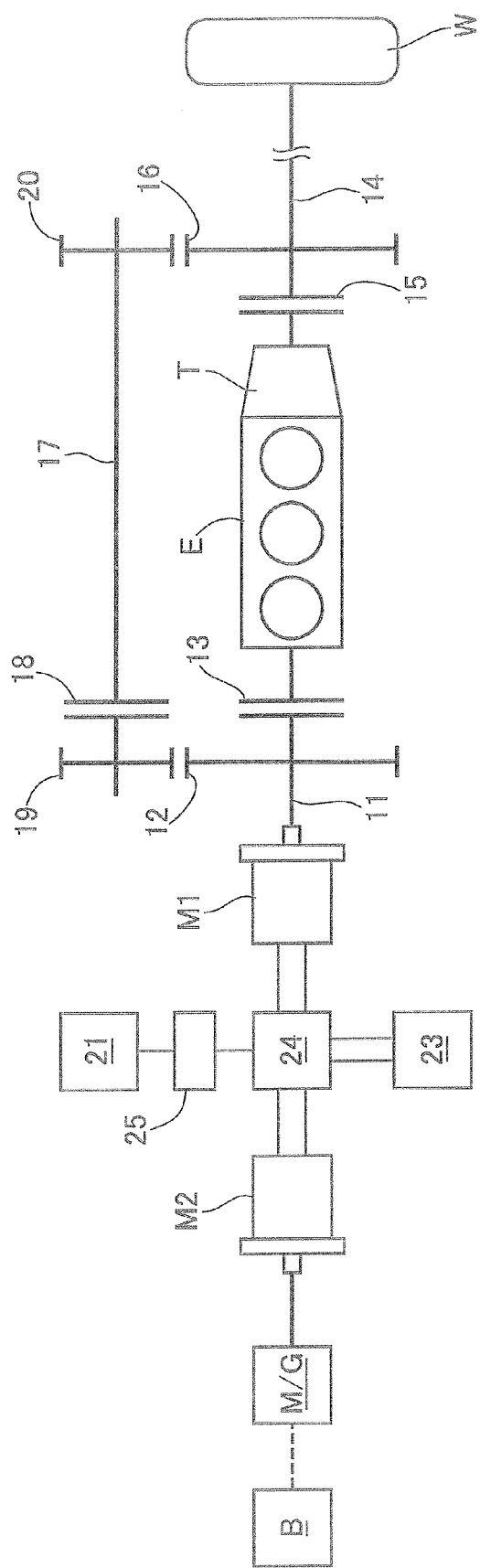
FIG. 16 is a diagram showing a driving force transmission system of a hydraulic hybrid vehicle to which the flow rate control valve of the present invention is applied. (ninth embodiment)

A ninth embodiment of the present invention is now explained by reference to FIG. 16.

The ninth embodiment is a modification of the first embodiment (see FIG. 1); in addition to a first pump/motor M1 connected directly to an engine E, it includes a second pump/motor M2 connected to a battery B via a motor/generator MG. In the first embodiment, energy for driving the first pump/motor M1 is stored in the accumulator 22 as hydraulic energy, whereas in the ninth embodiment, energy for driving the first pump/motor M1 is stored in the battery B as electrical energy, the motor/generator MG is operated as a motor by the battery B, the second pump/motor M2 is operated as a pump by the driving force of the motor/generator MG, thus generating liquid pressure for driving the first pump/motor M1, and the second pump/motor M2 is operated as a motor by means of liquid pressure generated by the first pump/motor M1 operating as a pump to thus cause the motor/generator MG to generate electricity and charge the battery B with the electrical energy.

In accordance with this ninth embodiment, since electrical energy is stored in the battery B, compared with a case in which hydraulic energy is stored in an accumulator 22, energy density can be enhanced.

[Tenth Embodiment]

Figure 17:
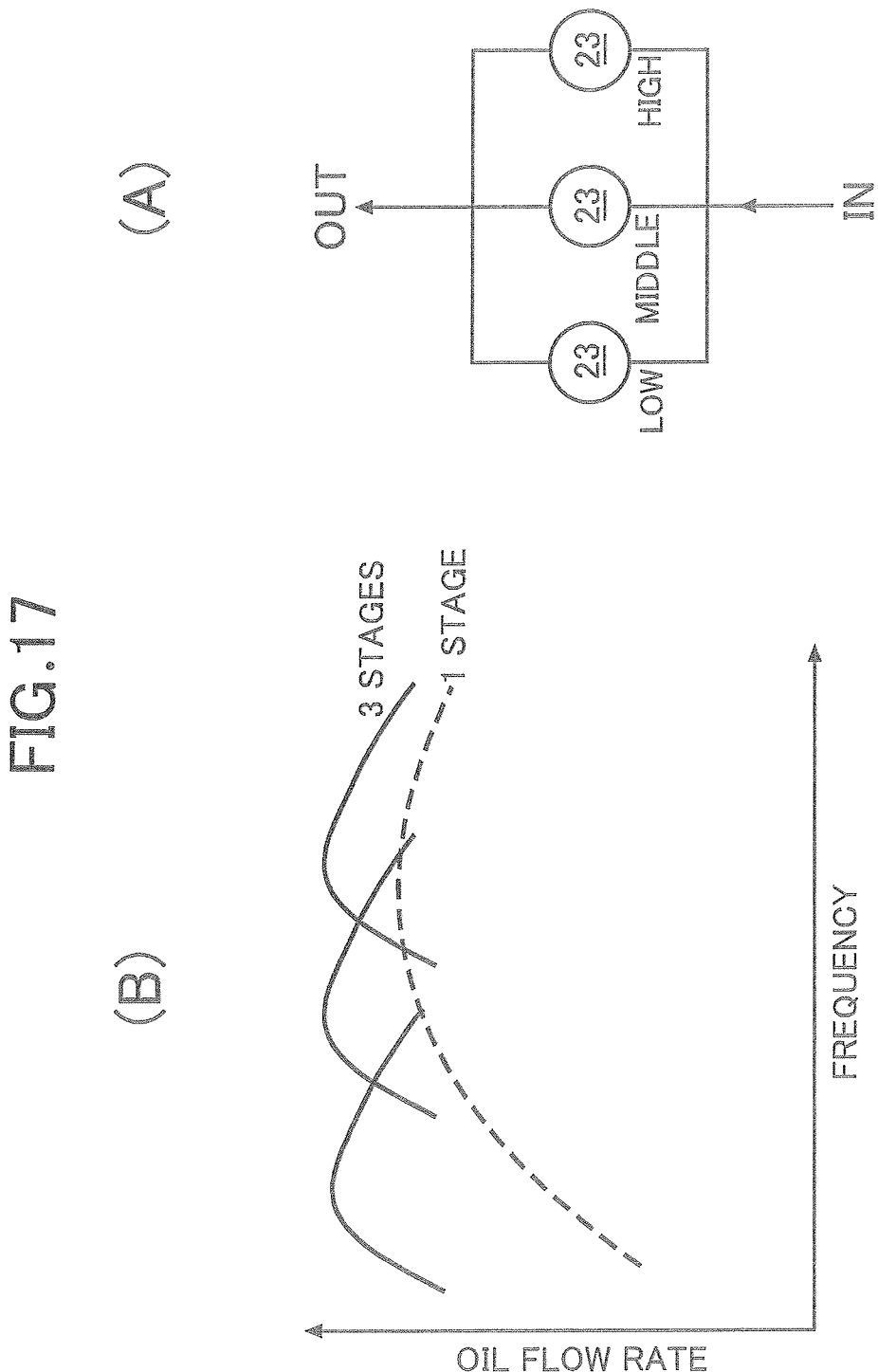
FIG. 17 is a diagram showing an embodiment employing a plurality of flow rate control valves. (tenth embodiment)

A tenth embodiment of the present invention is now explained by reference to FIG. 17.

The above-mentioned first to ninth embodiments include only one flow rate control valve 23, but the tenth embodiment includes three flow rate control valves 23 connected in parallel; the first flow rate control valve 23 has the characteristic that the efficiency is high in a low frequency region, the second flow rate control valve 23 has the characteristic that the efficiency is high in a middle frequency region, and the third flow rate control valve 23 has the characteristic that the efficiency is high in a high frequency region. Therefore, operating one of the three flow rate control valves 23 according to a required frequency region enables the efficiency to be further enhanced.

[Eleventh Embodiment]

An eleventh embodiment of the present invention is now explained by reference to FIG. 18 to FIG. 24.

A flow rate control valve 23 includes a valve housing 36 formed from a main body housing 61 and an end housing 64 joined to the main body housing 61 by bolts 63 with a partition wall plate 62 sandwiched therebetween. A circular cross-section large diameter hole 61a and a circular cross-section small diameter hole 61b are coaxially formed on an axis L of the main body housing 61, an arc-shaped input liquid chamber 61c is formed so as to surround part of the small diameter hole 61b, and an arc-shaped output liquid chamber 61d is formed so as to surround part of the large diameter hole 61a. An input port 61e communicating with the input liquid chamber 61c opens on one end face of the main body housing 61, and an output port 61f communicating with the output liquid chamber 61d opens on an outer peripheral face of the main body housing 61.

Formed, so as to face the output liquid chamber 61d, in a cylindrical sleeve 37 fitted into the large diameter hole 61a of the main body housing 61 and stopped from rotating by a pin 65 are first and second outlet openings 37a and 37b each having a central angle of 90° with the axis L as a center. The first and second outlet openings 37a and 37b have a rectangular shape when the sleeve 37 is in a developed state, have phases thereof displaced from each other by 180°, and are disposed at positions so as to overlap one another in the axis L direction.

Formed in a distributor 38 relatively rotatably fitted into the inner periphery of the sleeve 37 are first and second communication hole groups 38c and 38d that can overlap with the first and second outlet openings 37a and 37b of the sleeve 37. The first and second communication hole groups 38c and 38d are formed from a large number of circular communication holes 38e disposed in a staggered manner, have a central angle of 90° with the axis L as a center, have phases displaced from each other by 180°, and are disposed at positions so as to overlap one another in the axis L direction. The outlines of the first and second communication hole groups 38c and 38d have the same shape as the first and second outlet openings 37a and 37b and can completely overlap the first and second outlet openings 37a and 37b.

A rotor 42 includes a cylindrical portion 42a and a shaft portion 42b, the cylindrical portion 42a having an open end closed by a plug 43 is relatively rotatably fitted into the inner periphery of the distributor 38, and the shaft portion 42b extends through the partition wall plate 62 and extends to the interior of the end housing 64. The extremity of the cylindrical portion 42a of the rotor 42 is rotatably supported on the inner periphery of the small diameter hole 61b of the main body housing 61 via a bearing metal 66. Formed in the cylindrical portion 42a of the rotor 42 are a pair of first inlet openings 42c and 42c with a phase difference of 180°, the first inlet openings 42c and 42c being capable of communicating with the first and second communication hole groups 38c and 38d of the distributor 38, and in addition a pair of second inlet openings 42d and 42d with a phase difference of 180°, the pair of second inlet openings 42d and 42d having phases displaced by 90° relative to the pair of first inlet openings 42c and 42c. The total of four, that is, the first and second inlet openings 42c and 42c; 42d and 42d, aligned in the axis L direction are formed into a slit shape, the width thereof in the axis L direction coinciding with the width in the axis L direction of the first and second outlet openings 37a and 37b and the first and second communication hole groups 38c and 38d. An interior space 42e of the rotor 42 communicating with the first and second inlet openings 42c and 42c; 42d and 42d communicates with the input liquid chamber 61c of the main body housing 61 via liquid holes 42f.

A driven gear 68 fixed by bolts 67 to an end part of the distributor 38 facing the interior of the end housing 64 and a drive gear 70 provided on a rotary shaft 46a of a first electric motor 46 fixed to the end housing 64 by bolts 69 mesh with an idle gear 73 rotatably supported via a needle bearing 72 on an idle shaft 71 fixed to the partition wall plate 62. The number of teeth of the drive gear 70 is smaller than the number of teeth of the driven gear 68, rotation of the first electric motor 46 is reduced in speed and transmitted to the distributor 38, and the distributor 38 is rotated over an angular range of 90°.

A rotary shaft 47a of a second electric motor 47 fixed to the end housing 64 via bolts 74 is coaxially joined to the shaft portion 42a of the rotor 42 via a coupling 75. Therefore, the rotor 42 can be rotated at any speed by the second electric motor 47.

Figure 18:
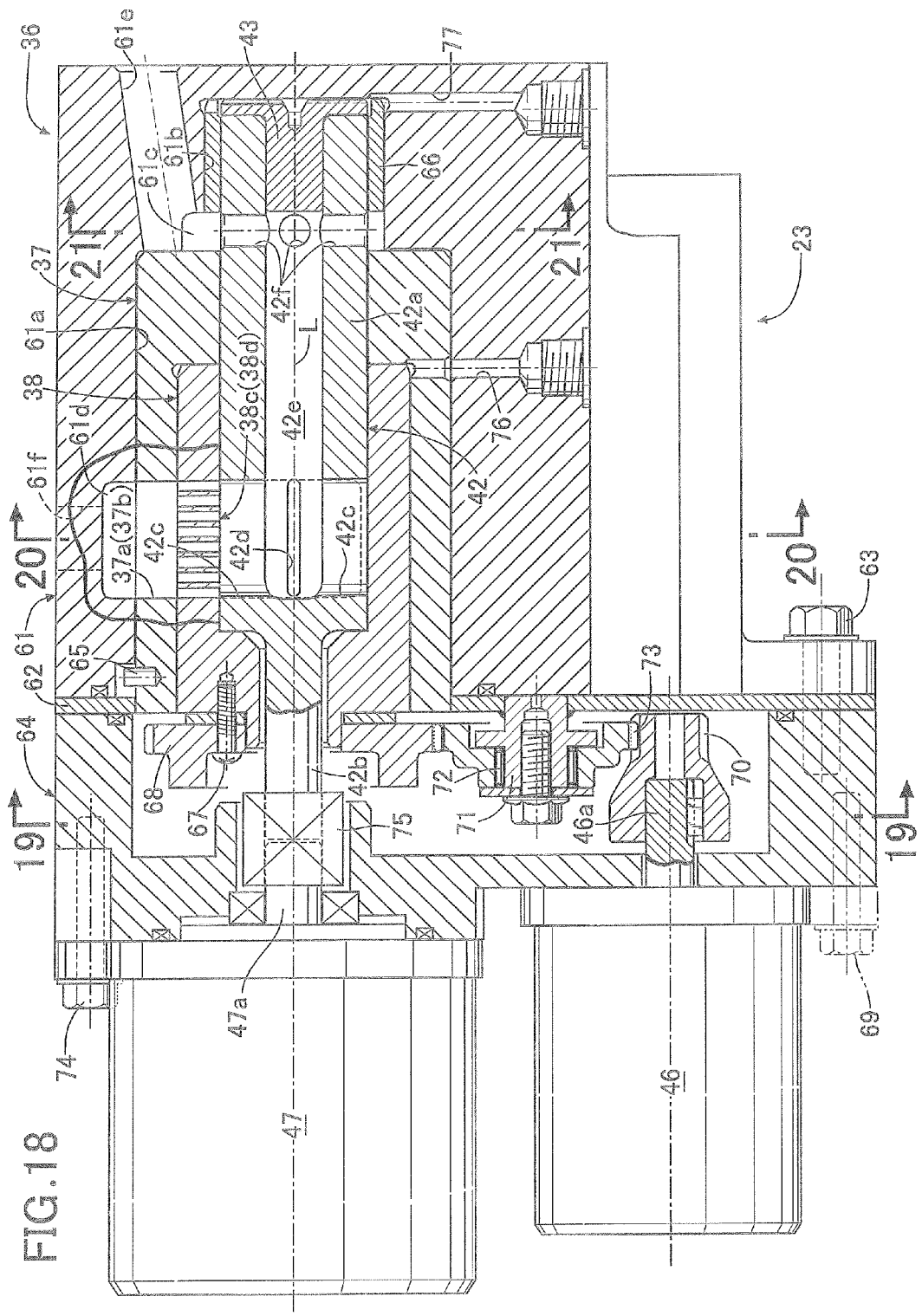
FIG. 18 is a sectional view of a flow rate control valve. (eleventh embodiment)
Figure 19:
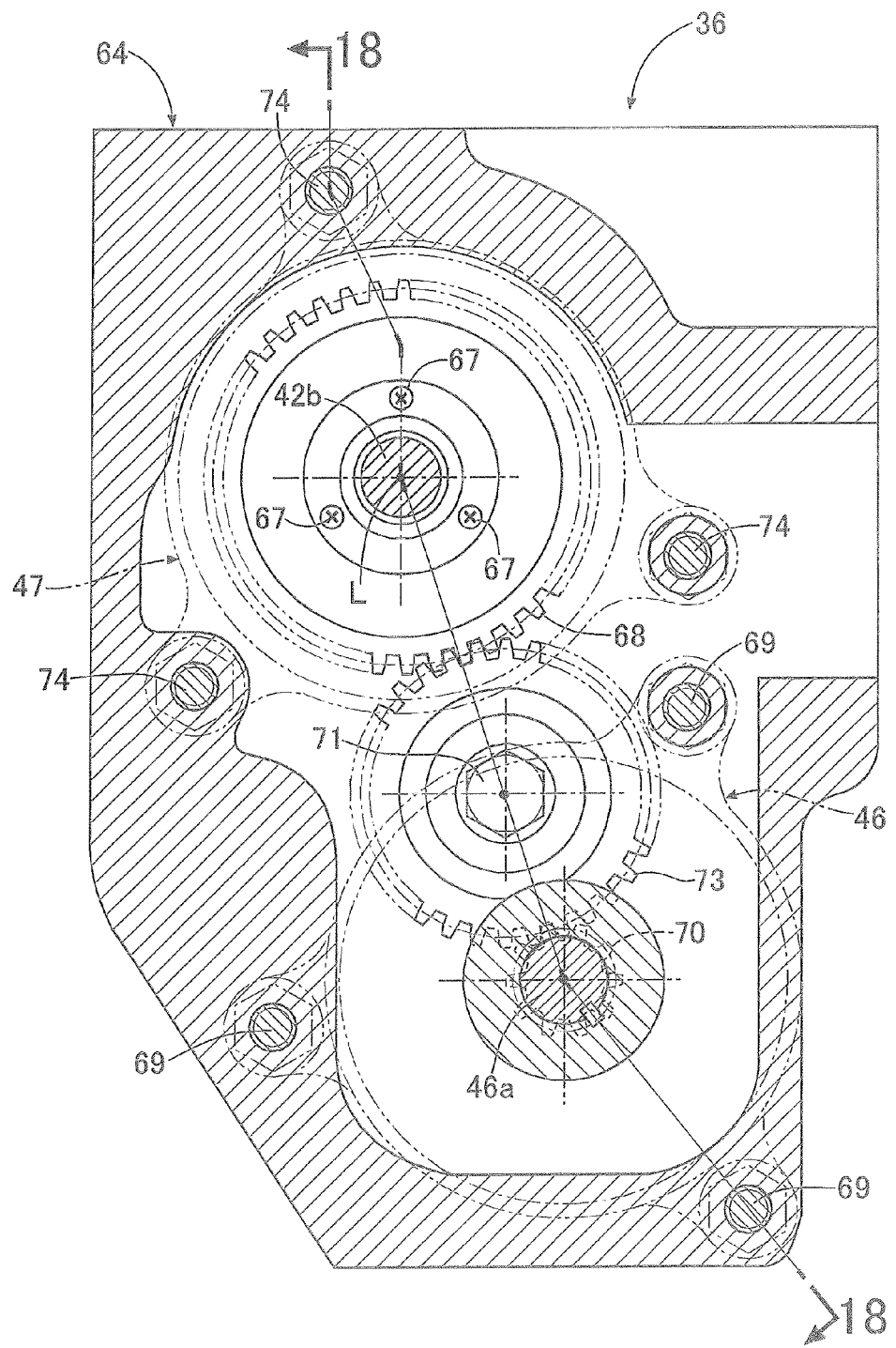
FIG. 19 is a sectional view along line 19-19 in FIG. 18. (eleventh embodiment)

In FIG. 18, the right end in the figure of the distributor 38 communicates with the atmosphere via a pressure equilibrium passage 76 extending through the main body housing 61 and the sleeve 37; balancing with the pressure at the left end in the figure of the distributor 38, which is at atmospheric pressure, prevents an offset load in the axis L direction from being imposed on the distributor 38. Similarly, the right end in the figure of the rotor 42 communicates with the atmosphere via a pressure equilibrium passage 77 extending through the main body housing 61; balancing with the pressure at the left end in the figure of the rotor 42, which is at atmospheric pressure, prevents an offset load in the axis L direction from being imposed on the rotor 42.

The operation of the flow rate control valve 23 having the above-mentioned arrangement is now explained.

Figure 20:
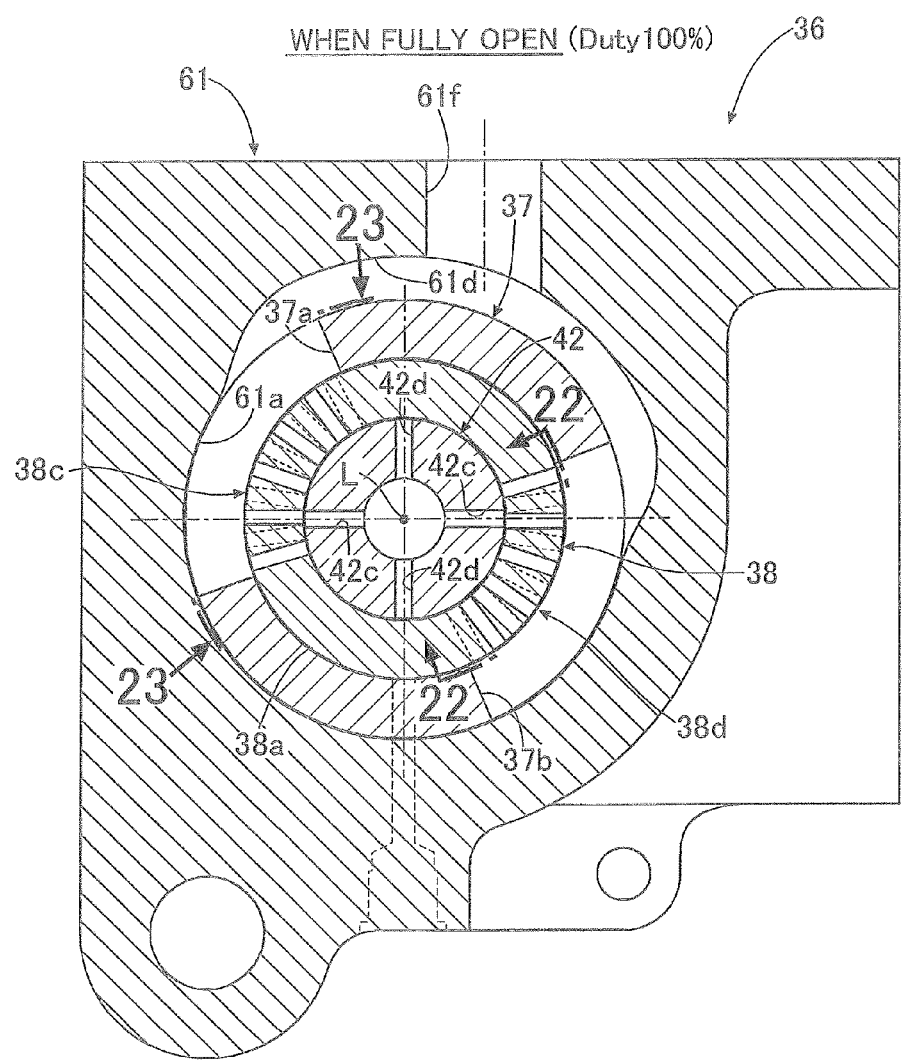
FIG. 20 is a sectional view along line 20-20 in FIG. 18. (eleventh embodiment)
Figure 21:
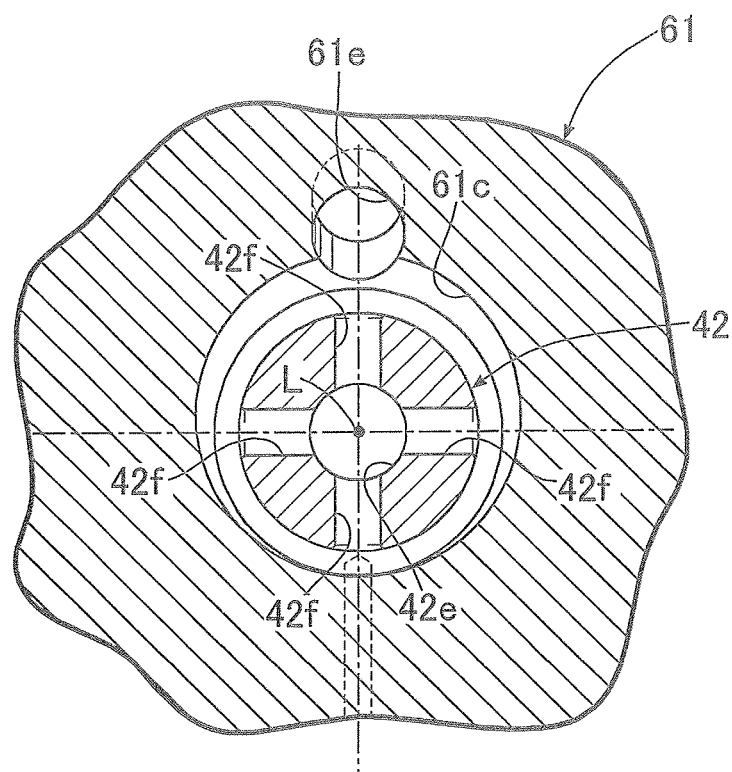
FIG. 21 is a sectional view along line 21-21 in FIG. 18. (eleventh embodiment)
Figure 22:
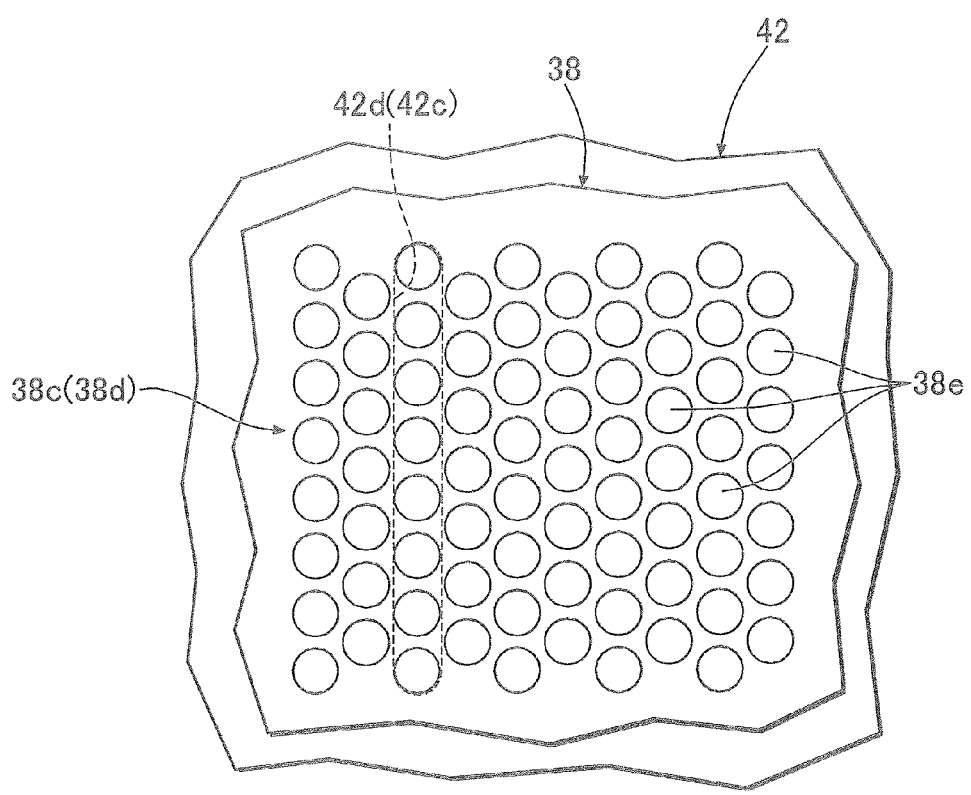
FIG. 22 is a sectional view along line 22-22 in FIG. 20. (eleventh embodiment)
Figure 23:
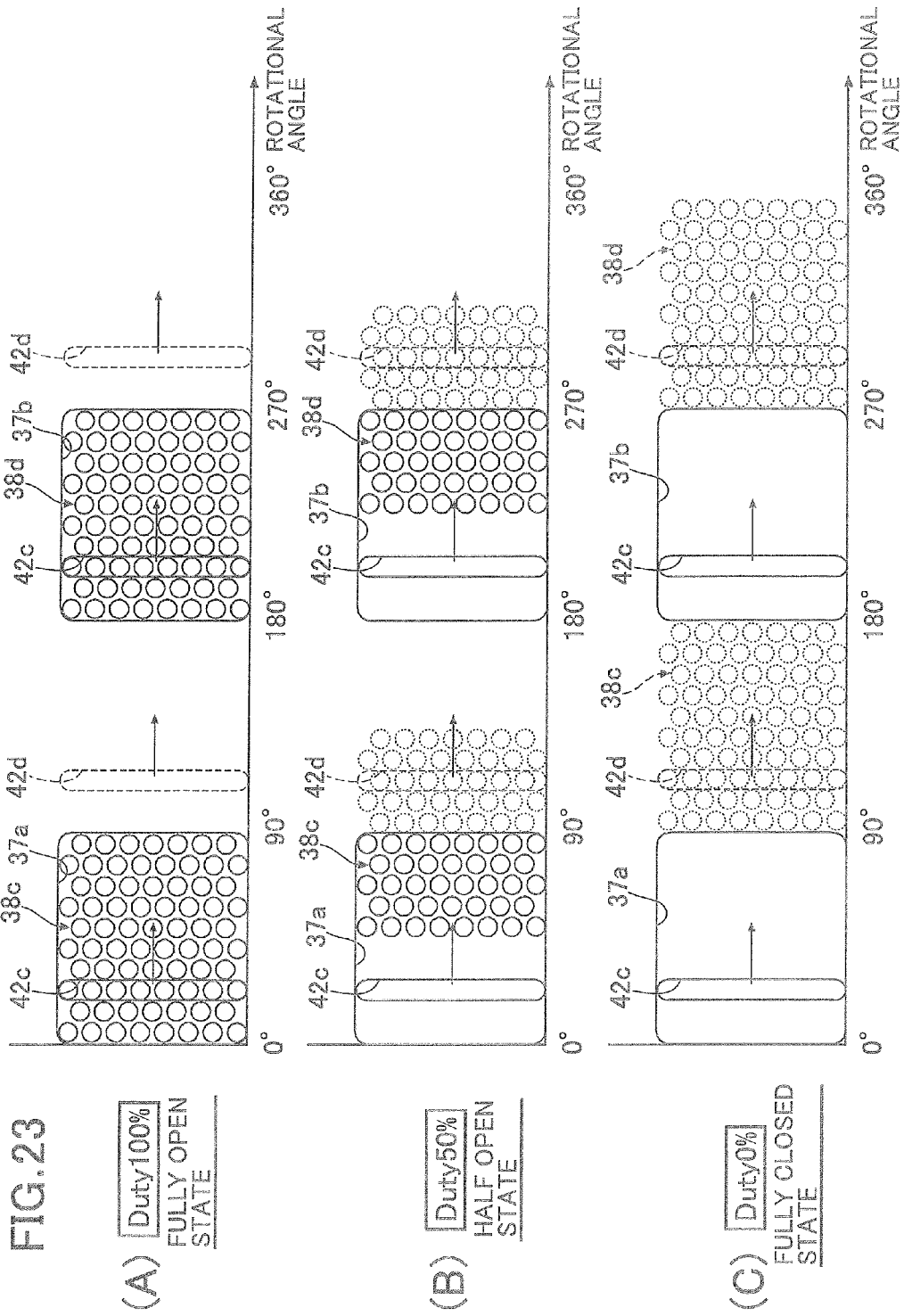
FIG. 23 is a developed view along line 23-23 in FIG. 20. (eleventh embodiment)
Figure 24:
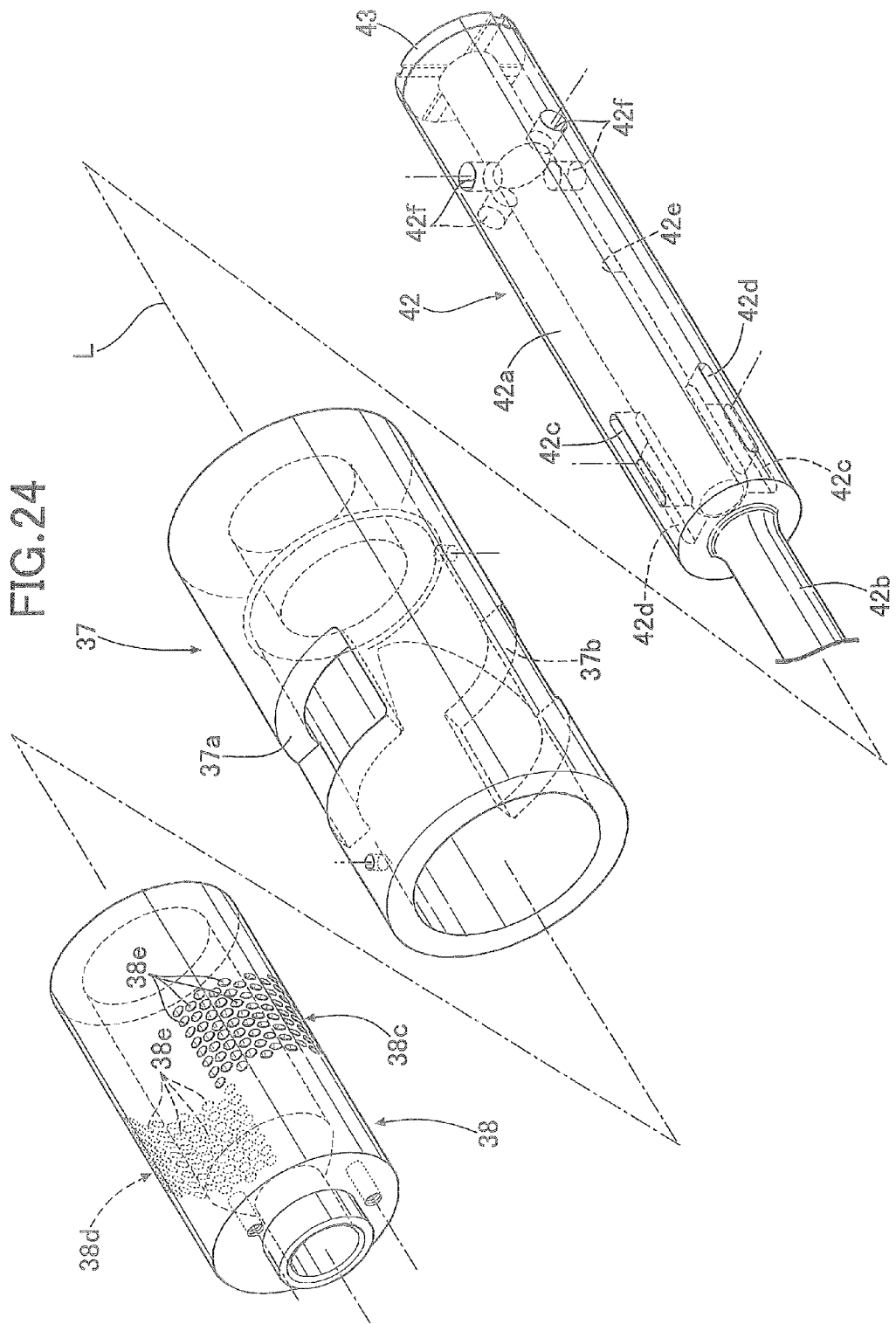
FIG. 24 is an exploded perspective view of a sleeve, a distributor, and a rotor. (eleventh embodiment)

FIG. 23 (A) to FIG. 23 (C) are views developed along line 23-23 in FIG. 20, and show states in which the sleeve 37 fixed to the valve housing 36, the distributor 38 rotated by the first electric motor 46 relative to the sleeve 37 over a range of 0° to 90°, and the rotor 42 rotated at a variable speed by the second electric motor 47 relative to the sleeve 37 and the distributor 38 are developed in the circumferential direction through 360°.

FIG. 23 (A) corresponds to a state with a duty ratio of 100%; the first and second outlet openings 37a and 37b of the sleeve 37 open over a range of 0° to 90° and a range of 180° to 270° within the central angle of 360° of the sleeve 37, and since the first and second communication hole groups 38c and 38d of the distributor 38 overlap the first and second outlet openings 37a and 37b of the sleeve 37 throughout the region, the effective open range of the first and second outlet openings 37a and 37b of the sleeve 37 is 0° to 90° and 180° to 270°. When the rotor 42 is rotated by means of the second electric motor 47 relative to the sleeve 37 and the distributor 38, the four first and second inlet openings 42c and 42c; 42d and 42d provided in the rotor 42 at intervals of 90° move from the left side to the right side in the figure. FIG. 23 (A) shows a state in which the two first inlet openings 42c and 42c overlap the effective open range and the two second inlet openings 42d and 42d do not overlap the effective open range.

When the pump/motor M operates as a motor, the input port 61e of the main body housing 61 is connected to an accumulator 22, and the output port 61f of the main body housing 61 is connected to a tank 21. Therefore, high pressure liquid of the accumulator 22 is supplied to the interior space 42e of the rotor 42 via the path: input port 61e of main body housing 61→input liquid chamber 61c of main body housing 61→liquid hole 42f of rotor 42. When the first and second inlet openings 42c and 42c; 42d and 42d facing the interior space 42e of the rotor 42 overlap the effective open range of the first and second communication hole groups 38c and 38d of the distributor 38 and the first and second outlet openings 37a and 37b of the sleeve 37, liquid of the interior space 42e of the distributor 38 is returned to the tank 21 via the path: first and second inlet openings 42c and 42c; 42d and 42d of rotor 42→first and second communication hole groups 38c and 38d of distributor 38→first and second outlet openings 37a and 37b of sleeve 37→output liquid chamber 61d of main body housing 61→output port 61f of main body housing 61, and the pump/motor M operates as a motor.

In a state in which the duty ratio is 100%, a range of 0° to 90° and a range of 180° to 270° of the sleeve 37 are the two effective open ranges, and the duty waveform generated by the two first inlet openings 42c and 42c of the rotor 42 is ON in a range of 0° to 90° and a range of 180° to 270° within the rotational angle of 360° of the rotor 42. On the other hand, the phases of the two second inlet openings 42d and 42d of the rotor 42 are displaced by 90° relative to the phases of the two first inlet openings 42c and 42c, and the duty waveform generated by the two second inlet openings 42d and 42d of the rotor 42 is therefore ON in a range of 90° to 180° and a range of 270° to 360° within the rotational angle of 360° of the rotor 42.

Therefore, superimposing the duty waveform generated by the two first inlet openings 42c and 42c and the duty waveform generated by the two second inlet openings 42d and 42d gives a waveform with a duty ratio of 100%.

FIG. 23 (B) is a diagram corresponding to a state with a duty ratio of 50%; since a range of 0° to 45° and a range of 180° to 225° of the sleeve 42 are the two effective open ranges, the duty waveform generated by the two first communication holes 42c and 42c of the rotor 42 is ON in a range of 0° to 45° and in a range of 180° to 225° within the rotational angle of 360° of the rotor 42. On the other hand, the phase of the two second inlet openings 42d and 42d of the rotor 42 is displaced relative to the phase of the two first inlet openings 42c and 42c by 90°, and the duty waveform generated by the two second inlet openings 42d and 42d of the rotor 42 is therefore ON in a range of 90° to 135° and in a range of 270° to 315° within the rotational angle of 360° of the rotor 42.

Therefore, superimposing the duty waveform generated by the two first inlet openings 42c and 42c and the duty waveform generated by the two second inlet openings 42d and 42d gives a waveform having a duty ratio of 50%.

As shown in FIG. 23 (C), in a state in which the first and second communication hole groups 38c and 38d do not overlap the first and second outlet openings 37a and 37b at all, that is, in a state in which there is no effective open range, regardless of the phases of the first and second inlet openings 42c and 42c; 42d and 42d of the rotor 42, the first and second communication hole groups 38c and 38d and the first and second outlet openings 37a and 37b do not communicate with each other, and the duty ratio is 0%.

In this way, the flow rate control valve 23 outputs a duty waveform four times per rotation of the rotor 42. Therefore, when the speed at which the rotor 42 is rotated by means of the second electric motor 47 is defined as N, the frequency of the duty waveform outputted by the flow rate control valve 23 becomes 4N, and it is possible to obtain a high duty frequency while keeping the rotational speed of the second electric motor 47 low.

Furthermore, since the first and second communication hole groups 38c and 38d of the distributor 38 are disposed at the same positions in the axis L direction and are disposed axially symmetrically with an interval of 180°, even if a load from liquid passing through the first and second communication hole groups 38c and 38d acts on the distributor 38, the load does not result in bending deformation of the distributor 38 or tilting of the distributor 38. Therefore, it is possible to prevent galling from occurring between the distributor 38 and the sleeve 37 and rotor 42, thereby enabling the driving forces of the first and second electric motors 46 and 47 to be minimized.

As described above, in accordance with the present embodiment, since the flow rate of liquid supplied from the accumulator 22 to the pump/motor M is duty controlled by the flow rate control valve 23, compared with a case in which the flow rate of liquid is controlled by a throttle valve, heat loss can be reduced to thus give high efficiency. In this process, selecting an optimum duty frequency by adjusting the rotational speed of the rotor 42 enables higher efficiency to be obtained. Moreover, since the liquid pressure of the input liquid chamber 61c and the output liquid chamber 61d does not generate a thrust load on the distributor 38 and the rotor 42 in the axis L direction, it becomes unnecessary to support the distributor 38 and the rotor 42 so as to withstand such a thrust load, and it is possible to simplify the structure and cut the weight and cost.

[Twelfth Embodiment]

Figure 26:
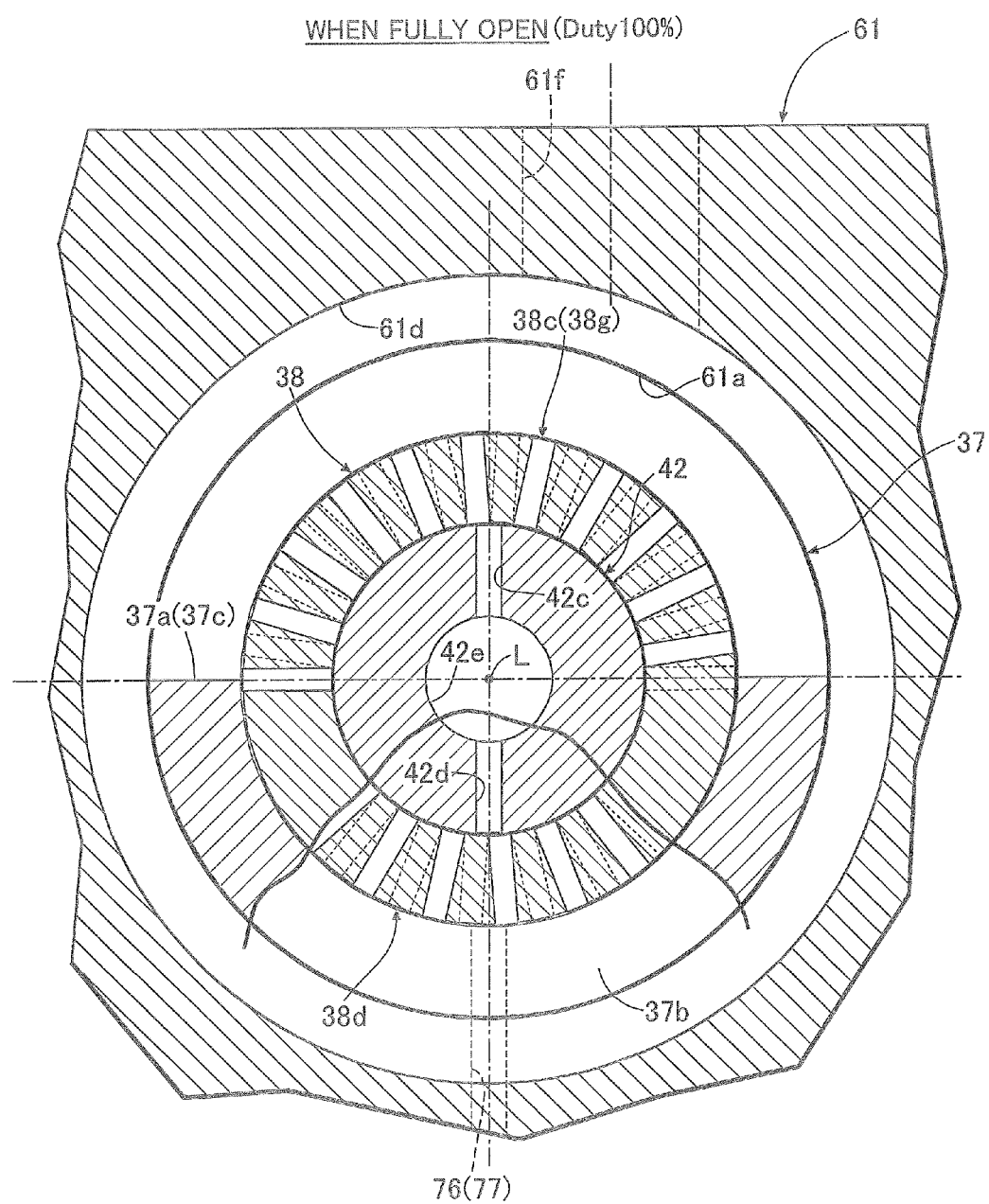
FIG. 26 is a sectional view along line 26-26 in FIG. 25. (twelfth embodiment)
Figure 27:
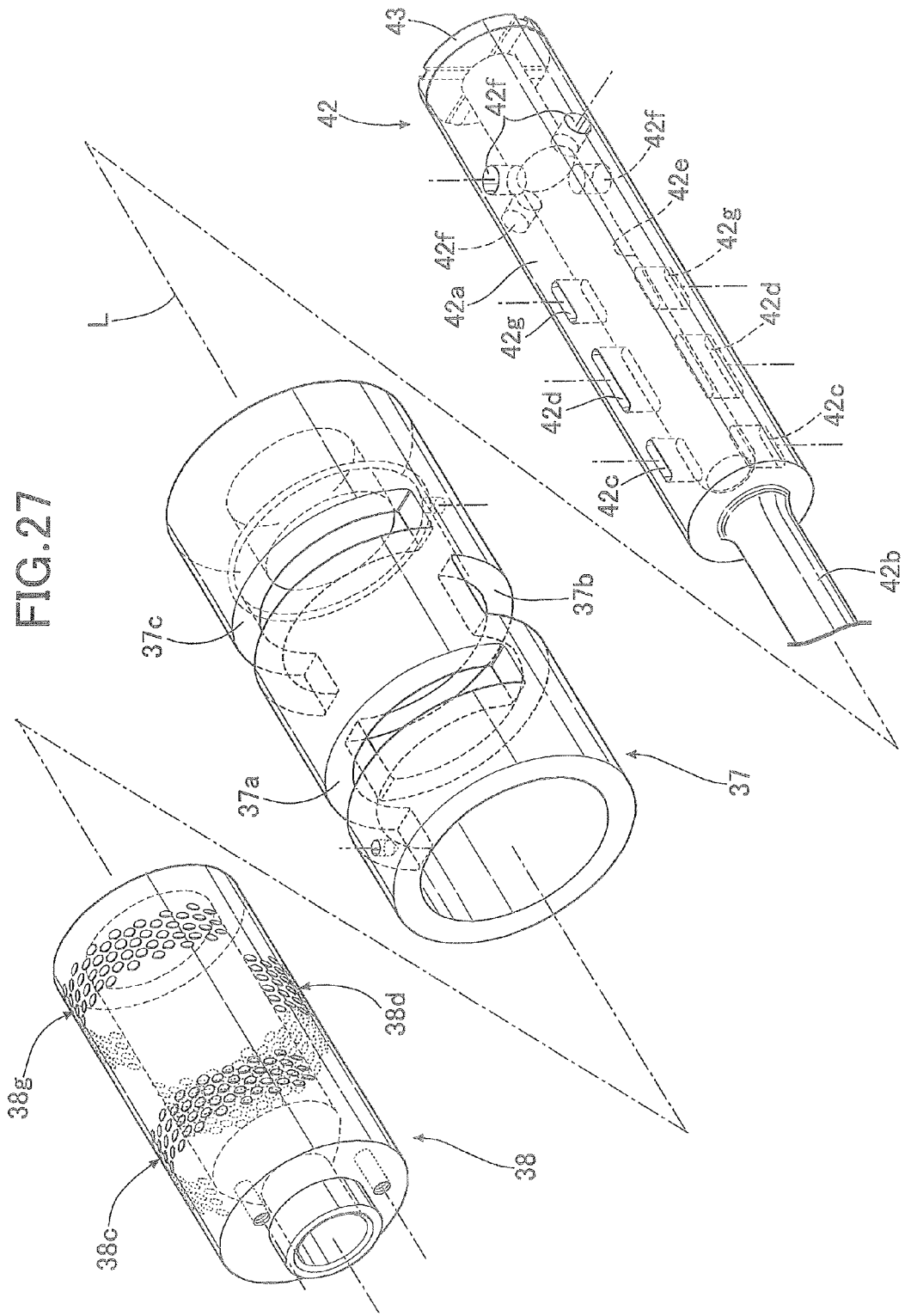
FIG. 27 is an exploded perspective view of a sleeve, a distributor, and a rotor. (twelfth embodiment)

A twelfth embodiment of the present invention is now explained by reference to FIG. 25 to FIG. 27.

The twelfth embodiment is a modification of the first embodiment. As explained in FIG. 6, in the first embodiment, the sleeve 37 includes the first and second outlet openings 37a and 37b having the same shape and a phase difference of 180° at positions spaced in the axis L direction, the distributor 38 includes the first and second communication hole groups 38c and 38d having the same shape and a phase difference of 180° at positions spaced in the axis L direction and, furthermore, the rotor 42 includes the two first inlet openings 42c and 42c having a phase difference of 180°, which can communicate with the first outlet opening 37a and the first communication hole group 38c, and the two second inlet openings 42d and 42d having a phase difference of 180°, which can communicate with the second outlet opening 37b and the second communication hole group 38d.

Figure 25:
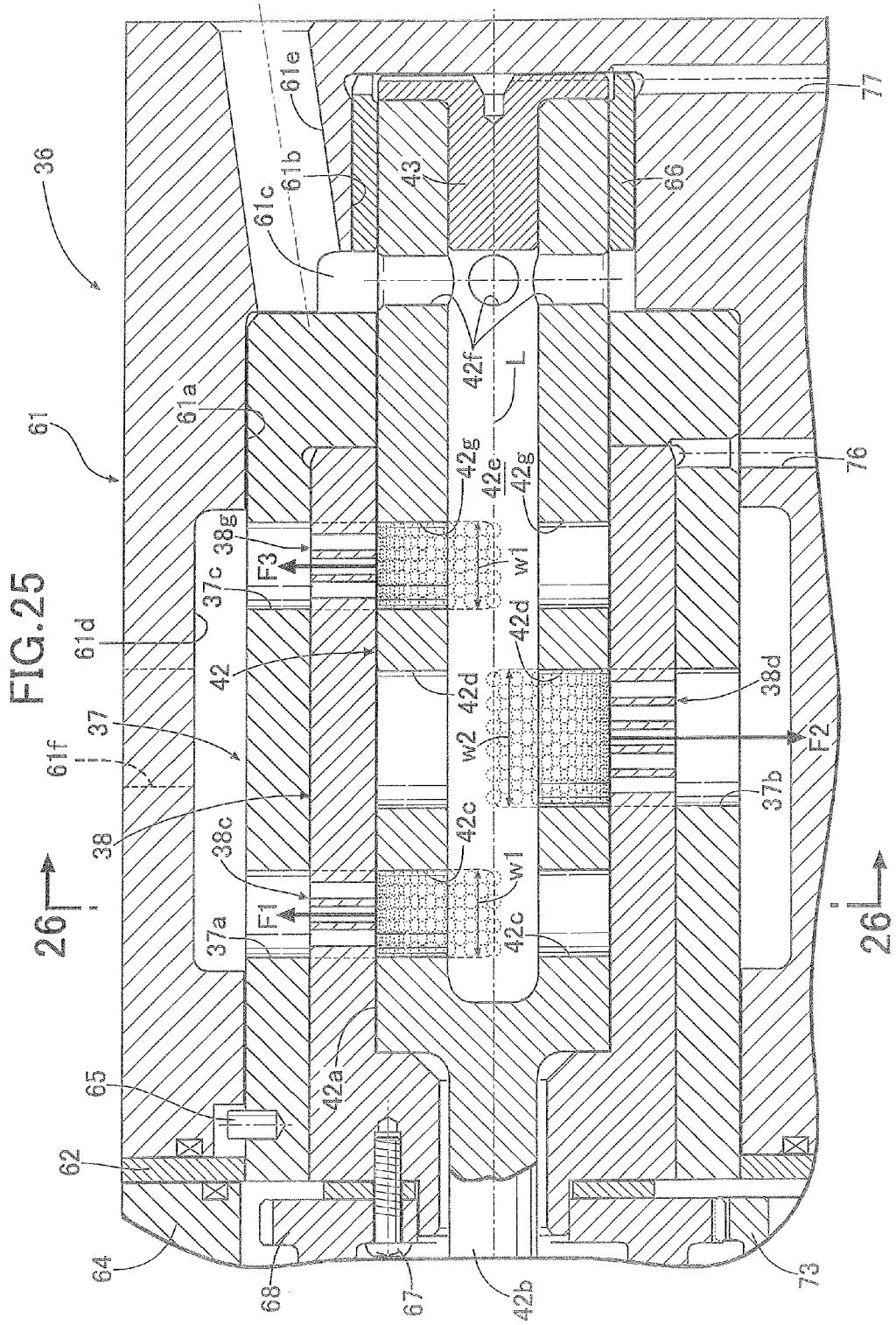
FIG. 25 is a sectional view of a flow rate control valve. (twelfth embodiment)

On the other hand, in the present embodiment, a sleeve 37 includes, in addition to first and second outlet openings 37a and 37b, a third outlet opening 37c, the phase of the third outlet opening 37c being the same as the phase of the first outlet opening 37a and being displaced relative to the phase of the second outlet opening 37b by 180°, and a width w1 in an axis L direction of the first and third outlet openings 37a and 37c being half a width w2 in the axis L direction of the second outlet opening 37b (see FIG. 25). Furthermore, in the present embodiment, a distributor 38 includes, in addition to first and second communication hole groups 38c and 38d, a third communication hole group 38g, the phase of the third communication hole group 38g being the same as the phase of the first communication hole group 38c and being displaced relative to the phase of the second outlet communication hole group 38d by 180°, and the width w1 in the axis L direction of the first and third communication hole groups 38c and 38g being half the width w2 in the axis L direction of the second communication hole group 38d (see FIG. 25). Moreover, a rotor 42 includes two sets of inlet openings formed from a first inlet opening 42c, a second inlet opening 42d, and a third inlet opening 42g having the same phase, the two sets having a phase difference of 180°, and the width w1 in the axis L direction of the first and third inlet openings 42c and 42g is half the width w2 in the axis L direction of the second inlet opening 42d (see FIG. 25).

In other words, the twelfth embodiment corresponds to one in which the first outlet opening 37a, the first communication hole group 38c, and the first inlet openings 42c and 42c of the first embodiment are divided into two, one of the divisions being defined as the third outlet opening 37c, the third communication hole group 38g, and the third inlet openings 42g and 42g and being disposed on the side opposite to the second outlet opening 37b, the second communication hole group 38d, and the second inlet openings 42d and 42d, and the operation of generating a liquid pressure duty waveform is the same as in the first embodiment.

However, in accordance with the twelfth embodiment, since in FIG. 25 loads F1 and F3 in the radial direction acting on the first and third communication hole groups 38c and 38g of the distributor 38 and a load F2 in the radial direction acting on the second communication hole group 38d of the distributor 38 are within the same plane (parallel to the plane of the paper in FIG. 26), the relationship in size F1=F3=F2/2 is satisfied, and the first and third communication hole groups 38c and 38g are disposed symmetrically on opposite sides in the axis L direction of the second communication hole group 38d, a moment that makes the axis L of the distributor 38 tilt is not generated by the loads F1 to F3. Therefore, it is possible to prevent galling from occurring between the distributor 38 and the sleeve 37 and rotor 42, thereby enabling the driving forces of the first and second electric motors 46 and 47 to be minimized.

[Thirteenth Embodiment]

A thirteenth embodiment of the first communication hole group 38c (or second and third communication hole groups 38d and 38g) of the distributor 38 is now explained by reference to FIG. 28.

In these embodiments, in a section where the first communication hole group 38c overlaps the first and second outlet openings 37a and 37b when the duty ratio gradually decreases and becomes close to 0%, the sequence and the shape of communication holes 38e are different from those of other sections.

Figure 28:
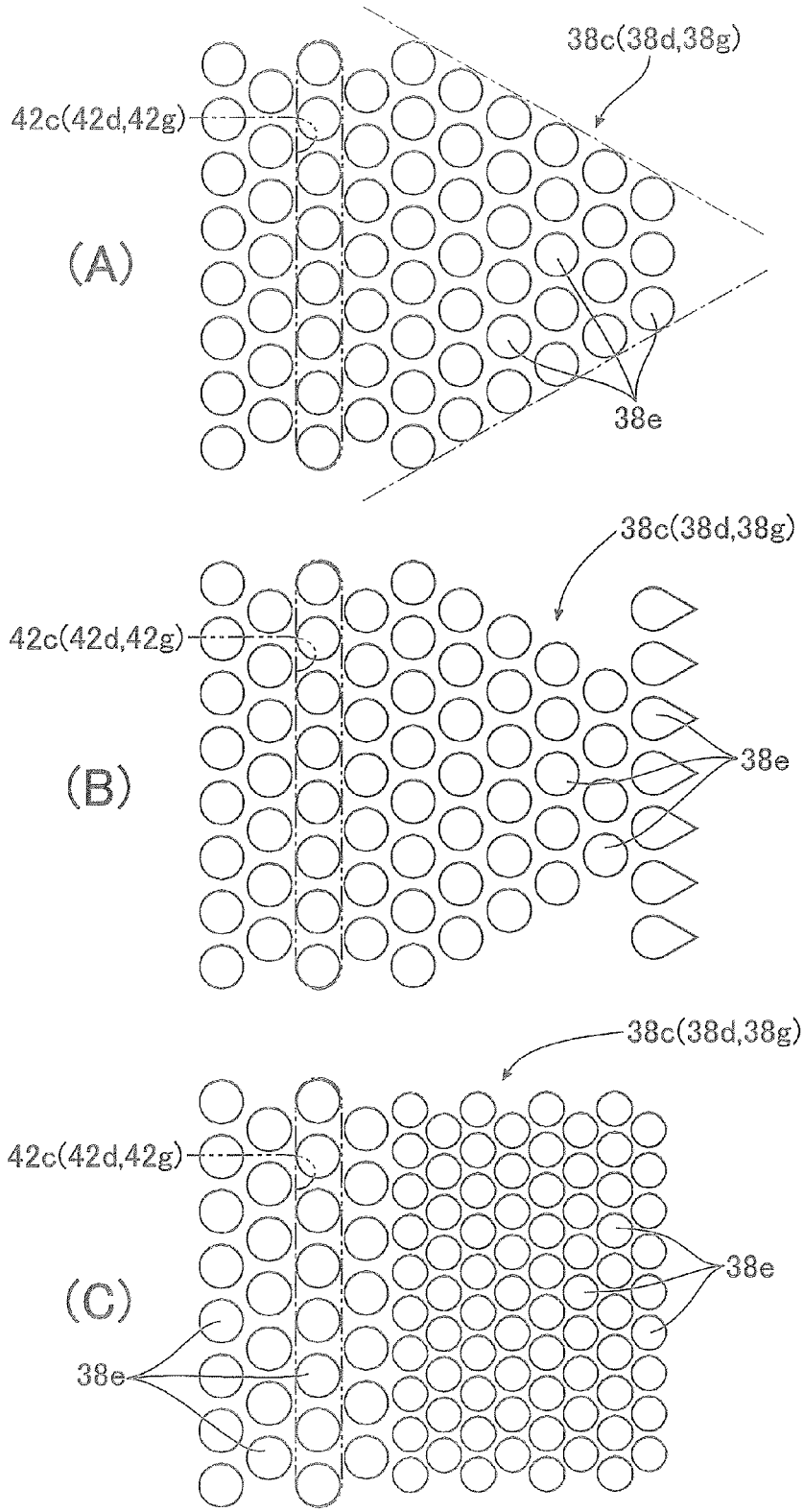
FIG. 28 is a diagram showing another embodiment of a communication hole group. (thirteenth embodiment)

That is, in an embodiment of FIG. 28 (A), in a region where the duty ratio is 30% to 0% the communication holes 38e are disposed so that the number of communication holes 38e disposed in the axis L direction of the distributor 38 gradually decreases. This prevents the area of overlap of the first communication hole group 38c and the first and second outlet openings 37a and 37b from rapidly becoming zero when the duty ratio becomes close to 0%, thus enhancing the ease of control of the duty ratio when the duty ratio is in the vicinity of 0%.

Furthermore, in an embodiment of FIG. 28 (B), communication holes 38e on the final line immediately before the duty ratio becomes 0% have a droplet shape, the area of overlap of the first communication hole group 38c and the first and second outlet openings 37a and 37b is prevented from rapidly becoming zero when the duty ratio becomes close to 0%, and in this embodiment also the ease of control of the duty ratio when the duty ratio is in the vicinity of 0% can be enhanced.

Moreover, in an embodiment of FIG. 28 (C), the diameter of the communication holes 38e in a region where the duty ratio is 30% to 0% is made smaller than the diameter of the communication holes 38e in other regions, and adjusting the number and arrangement of the small diameter communication holes 38e enables fine changes to be made in the area of overlap of the first communication hole group 38c and the first and second outlet openings 37a and 37b, thereby enhancing the ease of control of the duty ratio when the duty ratio is in the vicinity of 0%.

Modes for carrying out the present invention are explained above, but the present invention may be modified in a variety of ways as long as the modifications do not depart from the spirit and scope thereof.

For example, even if the direction of flow of liquid is reversed, the flow rate control valve 23 of each embodiment can normally exhibit a function of carrying out PWM control of liquid flow rate at any duty ratio and any duty frequency. That is, in each embodiment, liquid flows in from the input port 31e, 61e side and flows out from the output port 31f, 61f side, but the functions of the ports may be swapped so that liquid flows in from the output port 31f, 61f side and flows out from the input port 31e, 61e side. Therefore, in the invention of each Claim, the input port and the inlet opening include ones having the function of liquid flowing out and the output port and the outlet opening include ones having the function of liquid flowing in.

Furthermore, in the embodiments, the flow rate control valve 23 of the present invention is applied to a hydraulic hybrid vehicle, but the flow rate control valve 23 of the present invention may be used in any application. Applications to an automobile, etc. include those below.

(1) Flow rate control valve applied to variable flow rate oil pump
(2) Flow rate control valve applied to variable flow rate water pump
(3) Flow rate control valve applied to engine injector
(4) Flow rate control valve applied to air conditioner coolant pump
(5) Flow rate control valve applied to engine throttle valve
(6) Flow rate control valve applied to turbo boost pressure control Furthermore, the first and second electric motors 46 and 47 may be replaced by any drive source other than an electric motor.

The invention claimed is:

1. A liquid flow rate control valve comprising:
   a valve housing having an input port and an output port formed therein;
   a cylindrical sleeve fixed to an interior of the valve housing and having formed therein an outlet opening communicating with the output port,
   a cylindrical distributor relatively rotatably fitted into an inner periphery of the sleeve, driven to rotate by a first drive source, and having a communication hole group formed therein, a total area of overlap of the communication hole group with the outlet opening changing according to a rotational position of the cylindrical distributor; and
   a cylindrical rotor relatively rotatably fitted into an interior of the distributor, driven to rotate by a second drive source, having an interior space thereof connected to the input port, and having an inlet opening formed therein, a position at which the inlet opening communicates with overlapping sections of the outlet opening and the communication hole group changing in response to rotation of the cylindrical rotor;
   wherein the sleeve comprises first and second outlet openings having a central angle of 180°, having phases displaced from each other by 180°, and being spaced so as not to overlap one another in an axis direction,
   the distributor comprises first and second communication hole groups having a central angle of 180°, having phases displaced from each other by 180°, and being spaced so as not to overlap one another in the axis direction, and
   the rotor comprises two sets of first and second inlet openings having the same phase at positions with a phase difference of 180°.

2. The liquid flow rate control valve according to claim 1, wherein when the overlapping sections of the outlet opening of the sleeve and the communication hole group of the distributor are a minimum, an area of opening of the communication hole group of the distributor communicating with the inlet opening of the rotor decreases.

3. The liquid flow rate control valve according to claim 1, wherein when the overlapping sections of the outlet opening of the sleeve and the communication hole group of the distributor are a minimum, a hole diameter of the communication hole group of the distributor communicating with the inlet opening of the rotor decreases.

4. A liquid flow rate control valve comprising:
   a valve housing having an input port and an output port formed therein;
   a cylindrical sleeve fixed to an interior of the valve housing and having formed therein an outlet opening communicating with the output port,
   a cylindrical distributor relatively rotatably fitted into an inner periphery of the sleeve, driven to rotate by a first drive source, and having a communication hole group formed therein, a total area of overlap of the communication hole group with the outlet opening changing according to a rotational position of the cylindrical distributor; and
   a cylindrical rotor relatively rotatably fitted into an interior of the distributor, driven to rotate by a second drive source, having an interior space thereof connected to the input port, and having an inlet opening formed therein, a position at which the inlet opening communicates with overlapping sections of the outlet opening and the communication hole group changing in response to rotation of the cylindrical rotor;
   wherein the sleeve comprises first to third outlet openings having a central angle of 120°, having phases displaced from each other by 120°, and being spaced so as not to overlap one another in the axis direction,
   the distributor comprises first to third communication hole groups having a central angle of 120°, having phases displaced from each other by 120°, and being spaced so as not to overlap one another in the axis direction, and
   the rotor comprises three sets of first to third inlet openings having the same phase at positions with a phase difference of 120°.

5. The liquid flow rate control valve according to claim 4, wherein when the overlapping sections of the outlet opening of the sleeve and the communication hole group of the distributor are a minimum, an area of opening of the communication hole group of the distributor communicating with the inlet opening of the rotor decreases.

6. The liquid flow rate control valve according to claim 4, wherein when the overlapping sections of the outlet opening of the sleeve and the communication hole group of the distributor are a minimum, a hole diameter of the communication hole group of the distributor communicating with the inlet opening of the rotor decreases.

7. A liquid flow rate control valve comprising:
   a valve housing having an input port and an output port formed therein;
   a cylindrical sleeve fixed to an interior of the valve housing and having formed therein an outlet opening communicating with the output port,
   a cylindrical distributor relatively rotatably fitted into an inner periphery of the sleeve, driven to rotate by a first drive source, and having a communication hole group formed therein, a total area of overlap of the communication hole group with the outlet opening changing according to a rotational position of the cylindrical distributor; and
   a cylindrical rotor relatively rotatably fitted into an interior of the distributor, driven to rotate by a second drive source, having an interior space thereof connected to the input port, and having an inlet opening formed therein, a position at which the inlet opening communicates with overlapping sections of the outlet opening and the communication hole group changing in response to rotation of the cylindrical rotor,
   wherein the communication hole group of the distributor is disposed so that, when a liquid passes through the communication hole group of the distributor, a load that the liquid exerts on the distributor does not cause a moment that makes the axis of the distributor tilt.

8. The liquid flow rate control valve according to claim 7, wherein when the overlapping sections of the outlet opening of the sleeve and the communication hole group of the distributor are a minimum, an area of opening of the communication hole group of the distributor communicating with the inlet opening of the rotor decreases.

9. The liquid flow rate control valve according to claim 7, wherein when the overlapping sections of the outlet opening of the sleeve and the communication hole group of the distributor are a minimum, a hole diameter of the communication hole group of the distributor communicating with the inlet opening of the rotor decreases.

10. The liquid flow rate control valve according to claim 7, wherein the sleeve comprises first and second outlet openings having a central angle of 90°, having phases displaced from each other by 180°, and being disposed at positions so as to overlap one another in the axis direction, and the distributor comprises first and second communication hole groups having a central angle of 90°, having phases displaced from each other by 180°, and being disposed at positions so as to overlap one another in the axis direction, and the rotor comprises at a phase difference of 90° two first inlet openings having phases displaced from each other by 180° and two second inlet openings having phases displaced from each other by 180°, the first and second inlet openings being capable of communicating with the first and second communication hole groups.

11. The liquid flow rate control valve according to claim 10, wherein when the overlapping sections of the outlet opening of the sleeve and the communication hole group of the distributor are a minimum, an area of opening of the communication hole group of the distributor communicating with the inlet opening of the rotor decreases.

12. The liquid flow rate control valve according to claim 10, wherein when the overlapping sections of the outlet opening of the sleeve and the communication hole group of the distributor are a minimum, a hole diameter of the communication hole group of the distributor communicating with the inlet opening of the rotor decreases.

13. The liquid flow rate control valve according to claim 7, wherein the sleeve comprises first and third outlet openings and a second outlet opening having a central angle of 180°, having phases displaced from each other by 180°, and being spaced so as not to overlap one another in the axis direction, a width in the axis direction of the second outlet opening positioned in a middle being twice a width in the axis direction of the first and third outlet openings positioned on opposite sides thereof, the distributor comprises first and third communication hole groups and a second communication hole group having a central angle of 180°, having phases displaced from each other by 180°, and being spaced so as not to overlap one another in the axis direction, a width in the axis direction of the second communication hole group positioned in a middle being twice a width in the axis direction of the first and third communication hole groups positioned on opposite sides thereof, and the rotor comprises two sets of first to third inlet openings having the same phase at positions with a phase difference of 180°, the first to third inlet openings being capable of communicating with the first to third communication hole groups respectively.

14. The liquid flow rate control valve according to claim 13, wherein when the overlapping sections of the outlet opening of the sleeve and the communication hole group of the distributor are a minimum, an area of opening of the communication hole group of the distributor communicating with the inlet opening of the rotor decreases.

15. The liquid flow rate control valve according claim 13, wherein when the overlapping sections of the outlet opening of the sleeve and the communication hole group of the distributor are a minimum, a hole diameter of the communication hole group of the distributor communicating with the inlet opening of the rotor decreases.

* * * * *